(12) United States Patent
Lee et al.

(10) Patent No.: US 11,600,815 B2
(45) Date of Patent: Mar. 7, 2023

(54) COMPOSITE ELECTROLYTE, PROTECTIVE FILM INCLUDING COMPOSITE ELECTROLYTE, PROTECTED NEGATIVE ELECTRODE INCLUDING THE PROTECTIVE FILM, AND LITHIUM METAL BATTERY INCLUDING THE PROTECTED

(71) Applicants: Samsung Electronics Co., Ltd., Suwon-si (KR); Samsung SDI Co., Ltd., Yongin-si (KR)

(72) Inventors: Yonggun Lee, Suwon-si (KR); Saebom Ryu, Suwon-si (KR); Toshinori Sugimoto, Hwaseong-si (KR); Dongmin Im, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 385 days.

(21) Appl. No.: 16/196,030

(22) Filed: Nov. 20, 2018

(65) Prior Publication Data
US 2019/0181435 A1 Jun. 13, 2019

(30) Foreign Application Priority Data
Dec. 12, 2017 (KR) .................. 10-2017-0170448

(51) Int. Cl.
*H01M 10/056* (2010.01)
*H01M 10/0565* (2010.01)
(Continued)

(52) U.S. Cl.
CPC ........... *H01M 4/366* (2013.01); *H01M 4/134* (2013.01); *H01M 4/382* (2013.01); *H01M 4/485* (2013.01); *H01M 4/664* (2013.01); *H01M 4/667* (2013.01); *H01M 10/052* (2013.01); *H01M 10/056* (2013.01); *H01M 10/0525* (2013.01); *H01M 10/0565* (2013.01); *C08L 25/08* (2013.01); *C08L 27/16* (2013.01); *C08L 27/20* (2013.01);
(Continued)

(58) Field of Classification Search
None
See application file for complete search history.

(56) References Cited

U.S. PATENT DOCUMENTS 7,347,954 B2 3/2008 Banno et al.
8,808,565 B2 8/2014 Han et al.
(Continued)

FOREIGN PATENT DOCUMENTS

CN 1682319 A 10/2005
CN 107359309 A 11/2017
(Continued)

OTHER PUBLICATIONS

Cho et al., "High performance separator coated with amino-functionalized SiO2 particles for safety enhanced lithium-ion batteries", Journal of Membrane Science, 535, 2017, 151-157.
(Continued)

*Primary Examiner* — Haixia Zhang
(74) *Attorney, Agent, or Firm* — Cantor Colburn LLP

(57) ABSTRACT

A composite electrolyte includes: a positively charged particle, a particle that is positively charged by having a coordinate bond with a cation, or a combination thereof; and a lithium salt.

25 Claims, 8 Drawing Sheets

(51) Int. Cl.
- *H01M 4/36* (2006.01)
- *H01M 4/38* (2006.01)
- *H01M 4/134* (2010.01)
- *H01M 4/66* (2006.01)
- *H01M 10/0525* (2010.01)
- *H01M 4/485* (2010.01)
- *H01M 10/052* (2010.01)
- C08L 71/02 (2006.01)
- H01M 4/02 (2006.01)
- H01M 4/58 (2010.01)
- C08L 25/08 (2006.01)
- C08L 27/16 (2006.01)
- C08L 27/20 (2006.01)
- C08L 53/02 (2006.01)

(52) U.S. Cl.
CPC .............. *C08L 53/02* (2013.01); *C08L 71/02* (2013.01); *H01M 4/58* (2013.01); *H01M 2004/027* (2013.01); *H01M 2004/028* (2013.01); *H01M 2300/0028* (2013.01); *H01M 2300/0071* (2013.01); *H01M 2300/0082* (2013.01); *H01M 2300/0091* (2013.01); *H01M 2300/0094* (2013.01)

(56) References Cited

U.S. PATENT DOCUMENTS

| 10,741,846 | B2 | 8/2020 | Lee et al. | |
|---|---|---|---|---|
| 2005/0196677 | A1 | 9/2005 | Lee et al. | |
| 2006/0120021 | A1* | 6/2006 | Banno | H01G 11/52 361/502 |
| 2009/0029250 | A1 | 1/2009 | Stebani et al. | |
| 2010/0190058 | A1 | 7/2010 | Thackeray et al. | |
| 2011/0081601 | A1* | 4/2011 | Weber | H01M 50/411 429/494 |
| 2014/0050965 | A1* | 2/2014 | Ha | H01M 50/446 429/144 |
| 2015/0270523 | A1* | 9/2015 | Toyoda | |
| 2016/0079590 | A1 | 3/2016 | Roev et al. | |
| 2016/0351956 | A1 | 12/2016 | Lee et al. | |
| 2017/0005367 | A1 | 1/2017 | Van Berkel et al. | |
| 2017/0324097 | A1 | 11/2017 | Lee et al. | |
| 2018/0316051 | A1 | 11/2018 | Lee et al. | |

FOREIGN PATENT DOCUMENTS

| EP | 1770817 A2 | 4/2007 |
|---|---|---|
| EP | 3240087 A1 | 11/2017 |
| JP | 2005314646 | 11/2005 |
| JP | 2007149648 A | 6/2007 |
| KR | 100362289 B1 | 11/2002 |
| KR | 100726891 B1 | 6/2007 |
| KR | 100736912 B1 | 7/2007 |
| KR | 101348391 B1 | 1/2014 |
| KR | 101648001 B1 | 8/2016 |
| KR | 1020160099133 A | 8/2016 |
| KR | 1020160140211 A | 12/2016 |
| KR | 1020170126404 A | 11/2017 |

OTHER PUBLICATIONS

European Search Report for European Patent Application No. 18206452.7 dated May 17, 2019.
Liu et al., "Functional metal-organic framework boosting lithium metal anode performance via chemical interaction*", Chemical Science, 8, 2017, 4285.
Jennifer L. Schaefer, et al., "High Lithium Transference Number Electrolytes via Creation of 3-Dimensional, Charged, Nanoporous Networks from Dense Functionalized Nanoparticle Composites", Chem. Mater., Mar. 3, 2013, vol. 25, pp. 834-839.
Jiangfeng Qian, et al., "High rate and stable cycling of lithium metal anode", Nature Communications, Feb. 20, 2015, pp. 1-9.
Jianming Zheng, et al., "Electrolyte additive enabled fast charging and stable cycling lithium metal batteries", Nature Energy, Feb. 27, 2017, vol. 2, pp. 1-8.
Jianming Zheng, et al., "Research Progress towards Understanding the Unique Interfaces between Concenliated Electrolytes and Electrodes for Energy Storage Applications", Advanced Science, Mar. 31, 2017, vol. 4, Issue 8, pp. 1-19.
Jimin Shim, et al., "Polymer Composite Electrolytes Having Core-Shell Silica Fillers with Anion-Trapping Boron Moiety in the Shell Layer for All-Solid-State Lithium-Ion Batteries", Applied Materials & Interfaces, Mar. 24, 2015, vol. 7, pp. 7690-7701.
Kazuki Yoshida, et al., "Correlation between Battery Performance and Lithium Ion Diffusion in Glyme-Lithium Bis trifluoromethanesulfonyl)amide Equimolar Complexes", Journal of the Electrochemical Society, Jul. 17, 2012, 159 (7), pp. A1005-A1012.
Snehashis Choudhury, et al., "A highly reversible room-temperature lithium metal battery based on crosslinked hairy nanoparticles", Nature Communications, Dec. 4, 2015, pp. 1-9.
Yong-Gun Lee et al., "Dendrite-Free Lithium Deposition for Lithium Metal Anodes with Interconnected Microsphere Protection," Chemistry of Materials, Jul. 3, 2017, pp. 5906-5914, vol. 29.
Office Action dated Feb. 22, 2022 of KR Patent Application No. 10-2017-0170448.

* cited by examiner

COMPOSITE ELECTROLYTE, PROTECTIVE FILM INCLUDING COMPOSITE ELECTROLYTE, PROTECTED NEGATIVE ELECTRODE INCLUDING THE PROTECTIVE FILM, AND LITHIUM METAL BATTERY INCLUDING THE PROTECTED

CROSS-REFERENCE TO RELATED APPLICATION

This application claims priority to and the benefit of Korean Patent Application No. 10-2017-0170448, filed on Dec. 12, 2017, in the Korean Intellectual Property Office, and all the benefits accruing therefrom under 35 U.S.C. § 119, the content of which is incorporated herein by reference in its entirety.

BACKGROUND

1. Field

The present disclosure relates to a composite electrolyte, a protective film including the composite electrolyte, a protected negative electrode including the protective film, and a lithium metal battery including the protected negative electrode.

2. Description of the Related Art

A lithium secondary battery may have excellent charge/discharge efficiency and capacity, no memory effect, and minimal self-discharge when not in use. Thus, since their commercialization, the lithium secondary battery has been used as the core electrical component of portable electronic devices. In recent years, the use of lithium secondary batteries has expanded from devices using a small-to-medium size battery, such as vacuum machines or power tools, to devices using a medium-to-large size battery, such as electric vehicles, energy storage devices, and various types of robots.

A lithium secondary battery including a carbonaceous negative electrode material has a low energy density and a low discharge capacity. In this regard, attempts have been made to improve the energy density and the capacity of the negative electrode for a lithium secondary battery.

In a lithium secondary battery, when lithium metal is used as a negative electrode, specific energy, i.e., energy per unit weight, and an energy density, i.e., energy per unit volume, of the lithium secondary battery may increase to 3 times relative to non-lithium batteries due to the low density and low oxidation/reduction potential (−3.045 V vs. standard hydrogen electrode (SHE)) of lithium.

Upon electrochemical deposition/stripping of lithium metal, which occurs during charge/discharge processes, there is an increase in the specific surface area of a negative electrode due to lithium dendrite growth. There is also a side reaction which occurs between lithium metal and an electrolyte solution and/or anions of the electrolyte solution. Accordingly, the charge and discharge characteristics of lithium secondary batteries are poor.

Therefore, it would be desirable to have a lithium secondary battery having improved energy density with improved charge and discharge characteristics.

SUMMARY

Provided is a composite electrolyte having increased lithium ion mobility.

Provided is a protective film that may prevent a side reaction between a lithium metal negative electrode and an electrolyte solution and/or anions of the electrolyte solution, by including the composite electrolyte.

Provided is a protected negative electrode including the protective film, and having suppressed volumetric change upon charging and discharging.

Provided is a lithium metal battery including the protected negative electrode and having improved cycle characteristics.

Additional aspects will be set forth in part in the description which follows and, in part, will be apparent from the description, or may be learned by practice of the presented embodiments.

According to an aspect of an embodiment, a composite electrolyte includes: a positively charged particle, a particle that is positively charged by having a coordinate bond with a cation, or a combination thereof; and a lithium salt.

According to an aspect of another embodiment, a protective film includes the composite electrolyte.

According to an aspect of still another embodiment, a protected negative electrode includes: a negative electrode including lithium metal or a lithium metal alloy; and the protective film on the negative electrode.

According to an aspect of still another embodiment, a lithium battery includes: a positive electrode; a protected negative electrode including lithium metal or a lithium metal alloy, and a protective film on the lithium metal or lithium metal alloy; and an electrolyte between the positive electrode and the protected negative electrode, wherein the protective film comprises a composite electrolyte including a positively charged particle, a particle that is positively charged by having a coordinate bond with an cation, or a combination thereof; and a lithium salt.

According to an aspect of another embodiment, a method of manufacturing a protected negative electrode includes: providing a negative electrode including lithium metal or a lithium metal alloy; and contacting the negative electrode with a composite electrolyte comprising a positively charged particle having a coordinate bond to an cation, and a lithium salt to form a protective film on the negative electrode and manufacture the protected negative electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
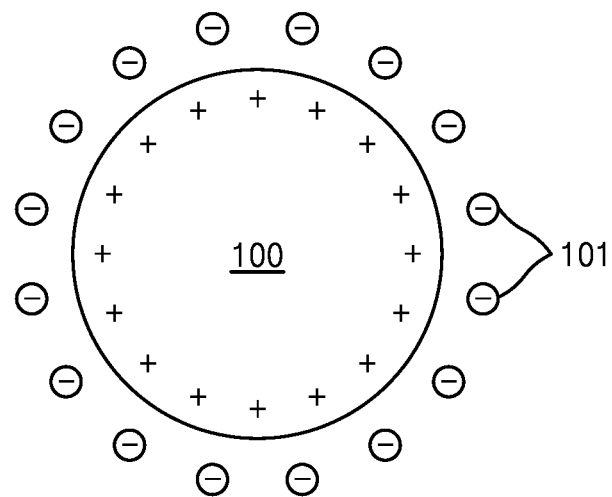
FIG. 1 is a schematic view illustrating an embodiment of a positively charged particle.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. Expressions such as "at least one of," when preceding a list of elements, modify the entire list of elements and do not modify the individual elements of the list. As used herein, the term "and/or" includes any and all combinations of one or more of the associated listed items.

As the present inventive concept allows for various changes and numerous embodiments, particular embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope of the present inventive concept are encompassed in the present inventive concept.

The terms used in the present specification are merely used to describe particular embodiments, and are not intended to limit the present inventive concept. An expression used in the singular encompasses the expression of the plural, unless it has a clearly different meaning in the context. In the present specification, it is to be understood that the terms such as "comprises" and/or "comprising," or "includes" and/or "including", "having," or the like, are intended to indicate the existence of the features, numbers, steps, actions, components, parts, ingredients, materials, or combinations thereof disclosed in the specification, and are not intended to preclude the possibility that one or more other features, numbers, steps, actions, components, parts, ingredients, materials, or combinations thereof may exist or may be added. As used herein, "/" may be construed, depending on the context, as referring to "and" or "or".

In the drawings, the thicknesses of components, layers and regions are exaggerated or reduced for clarity. Like reference numerals in the drawings and specification denote like elements. In the present specification, it will be understood that when an element, e.g., a layer, a film, a region, or a substrate, is referred to as being "on" or "above" another element, it can be directly on the other element or intervening layers may also be present. In contrast, when an element is referred to as being "directly on" another element, there are no intervening elements present. While such terms as "first," "second,", or the like, may be used to describe various components, such components must not be limited to the above terms. The above terms are used only to distinguish one component from another. In the drawings, some of the components may be omitted to facilitate understanding of the features of the present inventive concept, but the present inventive concept is not intended to exclude the omitted components.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, according to example embodiments, a composite electrolyte, a protective film, a protected negative electrode, and a lithium metal battery including the composite electrolyte, the protective film, and the protected negative electrode are be described in further detail.

As used herein, the term "size" as used in reference to a particle, or alternatively, the term "particle size" may refer to an average particle diameter when the particle has a spherical shape. When the particle has a rod shape or an elliptical shape, the term "size" or "particle size" may refer to the length along a major axis.

The term "average particle size" or "average particle diameter", or "D50 particle size," as used herein, refers to a particle diameter corresponding to 50 percent (%) of the particles in a distribution curve in which the particles are accumulated in the order of particle diameter from the smallest particle to the largest particle, where the total number of accumulated particles is 100%. The average particle size may be measured by any suitable method. For example, the average particle size may be measured with a particle size analyzer, an image from a transmission electron microscope (TEM) or an image from a scanning electron microscope (SEM). As an example of another type of measuring method, the average particle size may be measured with a device using dynamic light scattering. According to this method, the number of particles within a predetermined size range may be counted, and an average particle diameter may be calculated therefrom.

The term "porosity" as used herein refers to a measure of the empty space (i.e., voids or pores) in a material, which is determined as a percentage of the volume of voids in a material based on the total volume of the material.

According to an example embodiment, a composite electrolyte includes a positively charged particle, a particle that is positively charged by having a coordinate bond with a cation, or a combination thereof; and a lithium salt. Since the composite electrolyte includes a positively charged particle and/or a particle that is positively charged by having a coordinate bond with an cation, i.e., an anion-accepting particle or an anion-withdrawing particle, an anion in the composite electrolyte may be localized to a surface of and/or in the vicinity of the particle. While not wanting to be bound by theory, it is understood that localizing the anion to a surface of the particle suppresses migration of anions in the composite electrolyte. The suppressed anion migration is understood to result in increased lithium ion migration in the composite electrolyte, resulting in an increase in the lithium ion transference number in the composite electrolyte.

Referring to FIG. 1, to maintain electrical neutrality, an anion 101 may be present on a surface of and/or in the vicinity of a positively charged particle 100. The particle that is positively charged by having a coordinate bond with a cation may be electrically neutral when the particle is not coordinated with a cation (e.g., a functional group represented by Formula 2); however, when unshared electrons are included, the particle may become the positively charged particle 100 through a coordinate bond, e.g. coordinate covalent bond, with a cation, e.g., proton. The particle that is positively charged by a coordinate bond with a cation may be present substantially as the positively charged particle 100 in the composite electrolyte including a lithium salt.

Figure 2:
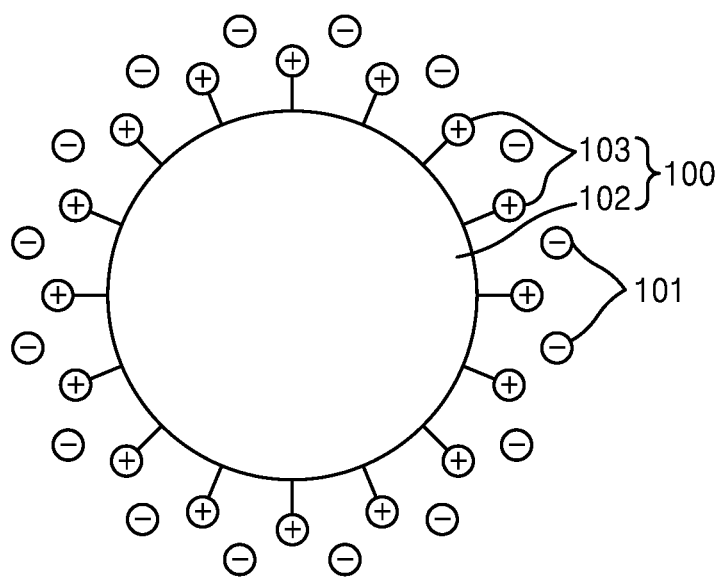
FIG. 2 is a schematic view illustrating an embodiment of a particle including a core and a positively charged functional group bound to the core.

Referring to FIG. 2, the positively charged particle 100 includes a core 102 and a plurality of positively charged functional groups 103 bound to the core 102. Accordingly, a plurality of anions 101 may be present in the vicinity of the positively charged particle 100. Each of the plurality of positively charged functional groups 103 may be bound to the core 102 via a covalent bond. The particle that is positively charged by a coordinate bond with a cation, may include a core and a functional group that is positively charged by a coordinate bond with a cation and which is bound to the surface of the core. For example, a tertiary amine group may change to a quaternary ammonium cation group by a coordinate bond with a proton. Thus, a functional group capable of being positively charged by a coordinate bond with a cation changes into a positively charged functional group by a coordinate bond with a proton. The functional group having a coordinate bond with a cation has a positive charge and thus may also be referred to herein as a functional group positively charged by a coordinate bond with a cation.

Hereinafter, unless otherwise indicated, a "particle" refers to a positively charged particle and/or a particle positively charged by a coordinate bond with an ion.

Figure 3A:
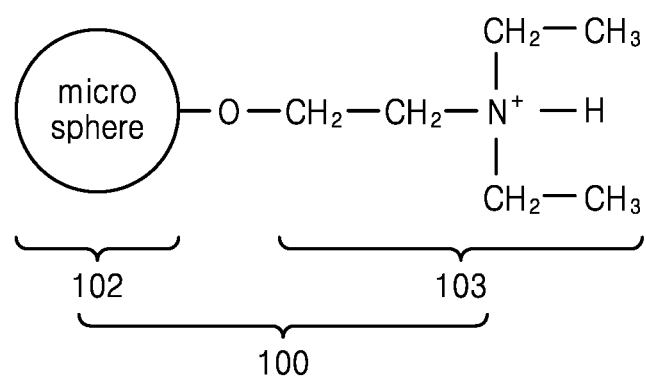
FIG. 3A is a schematic view illustrating an embodiment of a structure in which a an ethyldiethylammonium group is bound to a microspherical core.

A monomeric compound providing the functional group that is positively charged by a coordinate bond with a cation may be a weak base, wherein a pKa value of a conjugate acid of the monomeric compound may be 12 or lower, 11.5 or lower, 11 or lower, or 10.5 or lower. For example, a pKa value of a conjugated acid of the monomeric compound may be in a range of about 5 to about 12, about 5 to about 11.5, about 6 to about 11, or about 7 to about 10.5. The monomeric compound providing the functional group that is positively charged by a coordinate bond with a cation refers to a monomeric compound substituted with a hydrogen atom. The core may be bound to the functional group that may be positively charged by a coordinate bond with a cation. For example, as shown in FIG. 3A, in a particle in which a dimethyl ethyl amine group ($-CH_2CH_2N(CH_3)_2$) is bound to the core 102, the monomeric compound providing the dimethyl ethyl amine group may be dimethyl ethyl amine, and a pKa value of a conjugated acid of the dimethyl ethyl amine may be 10.16.

The positively charged functional group may be represented by Formula 1, and the functional group that is positively charged by a coordinate bond with a cation may be represented by Formula 2:

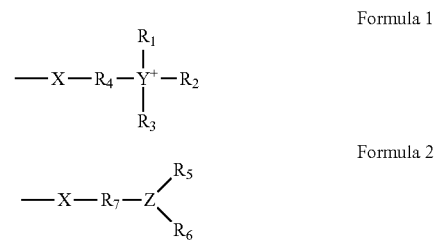

wherein, in Formulae 1 and 2,

X may be O, S, or a covalent bond, Y may be N or P, Z may be N or P, $R_1$, $R_2$, $R_3$, $R_5$, and $R_6$ may each independently be hydrogen, a $C_1$-$C_{20}$ alkyl group that is unsubstituted or substituted with a halogen, a $C_2$-$C_{20}$ alkenyl group that is unsubstituted or substituted with a halogen, a $C_2$-$C_{20}$ alkynyl group that is unsubstituted or substituted with a halogen, a $C_5$-$C_{20}$ aryl group that is unsubstituted or substituted with a halogen, or a $C_2$-$C_{20}$ heteroaryl group that is unsubstituted or substituted with a halogen, and $R_4$ and $R_7$ may each independently be a $C_1$-$C_{20}$ alkylene group that is unsubstituted or substituted with a halogen.

In some embodiments, the positively charged functional group may be represented by Formulae 3 to 10, or a combination thereof:

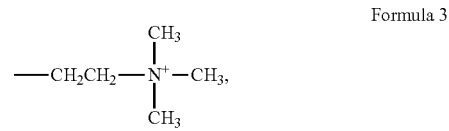

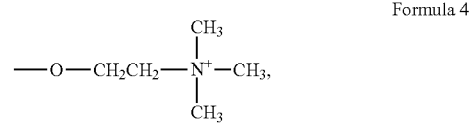

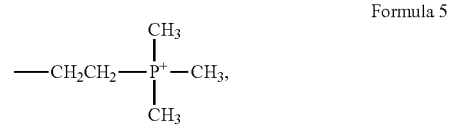

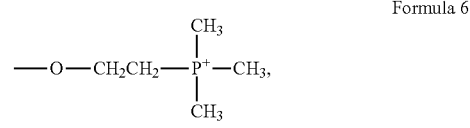

-continued

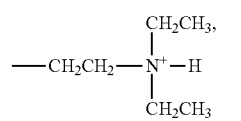

Formula 7

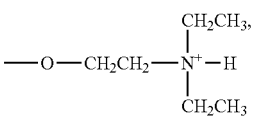

Formula 8

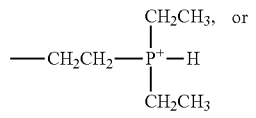

Formula 9

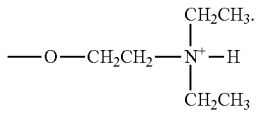

Formula 10

In some embodiments, the functional group positively charged by a coordinate bond with a cation may be represented by Formulae 11 to 18, or a combination thereof:

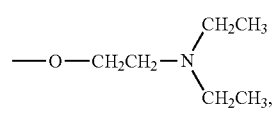

Formula 11

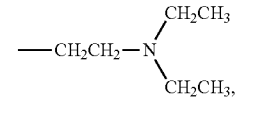

Formula 12

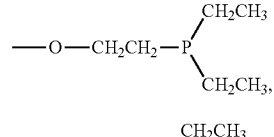

Formula 13

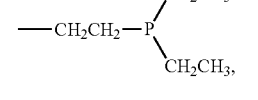

Formula 14

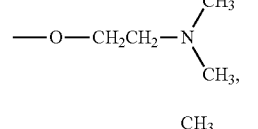

Formula 15

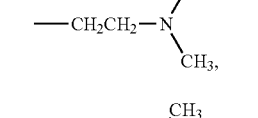

Formula 16

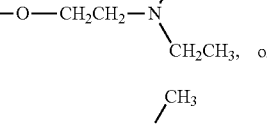

Formula 17

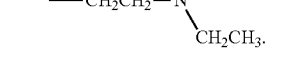

Formula 18

Referring to FIG. 2, an anion that confined to the vicinity of the positively charged particle may be any suitable anion. The anion may be, for example, separated from a lithium salt, which is divided into an anion and a lithium cation. The anion may be, for example, $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FSO_2)_2N^-$, $(C_2F_5SO_2)_2N^-$, $(C_2F_5SO_2)(CF_3SO_2)N^-$, $(CF_3SO_2)_2N^-$, or a combination thereof.

Referring to FIG. 3A, the positively charged particle 100 may include a core 102 which is microspherical and a functional group 103 bound to the surface of the core. The functional group 103 may include a diethylaminoethyl group coordinated with a proton.

Figure 3B:
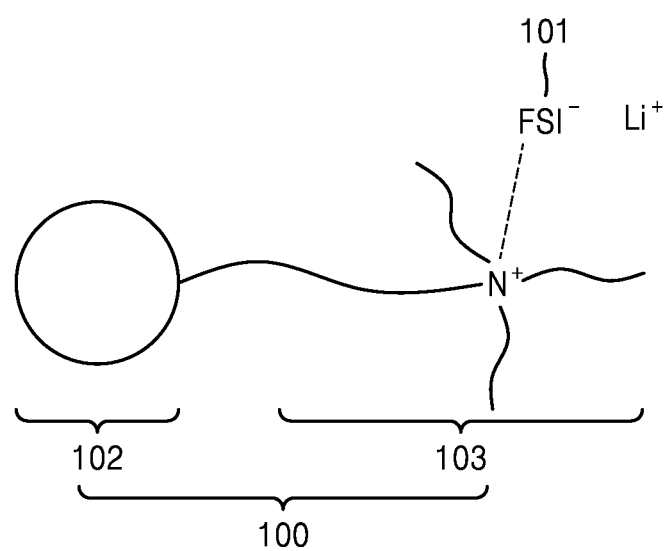
FIG. 3B is a schematic view illustrating an embodiment in which an anion of a lithium salt is confined to the vicinity of a positively charged particle.

Referring to FIG. 3B, the positively charged particle 100 may include the core 102 and the positively charged functional group 103 bound to the core 102. An anion 101 (e.g., bis(fluoro sulfonyl)imide anion, $FSI^-$) derived from a lithium salt may be confined to the vicinity of the positively charged functional group 103.

The particle may include an organic particle, an inorganic particle, an organic-inorganic particle, or a combination thereof. The organic particle may include an organic core. The inorganic particle may include an inorganic core. The organic-inorganic particle may include an organic-inorganic core.

The organic particle of the composite electrolyte may include a polystyrene homopolymer, a copolymer including a styrene repeating unit, polymethyl methacrylate, a copolymer containing a repeating unit having a crosslinkable functional group, a crosslinked polymer thereof, or a combination thereof.

The inorganic particle and the organic-inorganic particle of the composite electrolyte may include a cage-structured silsesquioxane, a metal-organic framework (MOF), $Li_{1+x+y}Al_xTi_{2-x}Si_yP_{3-y}O_{12}$, wherein $0<x<2$ and $0\leq y<3$, $BaTiO_3$, $Pb(Zr_xTi_{1-x})O_3$ wherein $0\leq x<1$ (PZT), $Pb_{1-x}La_xZr_{1-y}Ti_yO_3$ (PLZT), wherein $0\leq x<1$ and $0\leq y<1$, $Pb(Mg_3Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$), wherein $0<x<2$ and $0<y<3$, lithium aluminum titanium phosphate ($Li_xAl_yTi_z(PO_4)_3$, wherein $0<x<2$, $0<y<1$, and $0<z<3$, $Li_{1+x+y}(Al, Ga)_x(Ti, Ge)_{2-x}Si_yP_{3-y}O_{12}$, wherein $0\leq x\leq 1$ and $0\leq y\leq 1$, lithium lanthanum titanate ($Li_xLa_yTiO_3$), wherein $0<x<2$ and $0<y<3$, lithium germanium thiophosphate ($Li_xGe_yP_zS_w$), wherein $0<x<4$, $0<y<1$, $0<z<1$, and $0<w<5$, lithium nitride ($Li_xN_y$), wherein $0<x<4$ and $0<y<2$, a $SiS_2$-type glass ($Li_xSi_yS_z$), wherein $0<x<3$, $0<y<2$, and $0<z<4$, a $P_2S_5$-type glass ($Li_xP_yS_z$), wherein $0<x<3$, $0<y<3$, and $0<z<7$, $Li_2O$, LiF, LiOH, $Li_2CO_3$, $LiAlO_2$, a $Li_2O$—$Al_2O_3$—$SiO_2$—$P_2O_5$—$TiO_2$—$GeO_2$-based ceramic, a garnet-based ceramic, $Li_{3+x}La_3M_2O_{12}$, wherein $0\leq x\leq 5$ and M=Te, Nb, or Zr; a crosslinked structure thereof; or a combination thereof. The inorganic particle may optionally further include a crosslinkable functional group and thus an inorganic particle may have a crosslinked structure by the crosslinkable functional groups. In addition, when the inorganic particle has a crosslinkable functional group, an organic-inorganic particle comprising the organic particle and the inorganic particle may have a crosslinked structure.

The organic particle of the composite electrolyte may include any suitable polymer that may be used in forming a protective film. The particle in the protective film may include a polymer having low wettability against a liquid electrolyte.

The organic particle of the composite electrolyte may include an organic particle including a polystyrene homopolymer, a copolymer including a styrene repeating unit, a copolymer containing a repeating unit having a crosslinkable functional group, a crosslinked polymer thereof, or a combination thereof.

The organic particle of the composite electrolyte may include a polymer including a styrene-based repeating unit (e.g., a styrene homopolymer or copolymer). When the organic particle is a polymer including a styrene-based repeating unit, which is hydrophobic and essentially not wettable to an electrolyte, the polymer may not adversely affect the lithium metal electrode, and the reactivity of the lithium metal electrode with the electrolyte may be suppressed.

The organic particle may include a polystyrene homopolymer, a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly(methacrylate-butadiene-styrene) copolymer, a poly(styrene-acrylate) copolymer, a poly(acrylonitrile-styrene-acrylate) copolymer; a crosslinked structure thereof; or a combination thereof. The organic particle may be, for example, a poly(styrene-vinylbenzene) copolymer.

The polymer may be a crosslinked polymer. The crosslinked polymer may be a poly(styrene-divinylbenzene) copolymer, a poly(methyl methacrylate-divinylbenzene), or combination thereof. When the copolymer contains the styrene-based repeating unit, a content of the styrene-based repeating unit may be in a range of about 65 parts by weight to about 99 parts by weight, about 80 parts by weight to about 99 parts by weight, about 90 parts by weight to about 99 parts by weight, or for example, about 96 parts by weight to about 99 parts by weight, based on 100 parts by weight of the total weight of the copolymer. When the copolymer contains divinylbenzene, a content of the divinylbenzene may be in a range of about 1 part by weight to about 35 parts by weight, about 1 part by weight to about 20 parts by weight, about 1 part by weight to about 10 parts by weight, or about 1 part by weight to about 4 parts by weight, for example, about 3 parts by weight to about 7 parts by weight or about 3 parts by weight to about 5 parts by weight, based on 100 parts by weight of the total weight of the copolymer. The copolymer described above may include a block copolymer, a random copolymer, an alternating copolymer, a graft copolymer, or a combination thereof. A weight average molecular weight of the copolymer may be in a range of about 10,000 Daltons to about 1,000,000 Daltons, about 10,000 Daltons to about 500,000 Daltons, about 10,000 Daltons to about 200,000 Daltons, or about 15,000 Daltons to about 150,000 Daltons, or about 20,000 Daltons to about 150,000 Daltons. The copolymer may be, for example, a block copolymer.

In sequence, blocks that constitute the copolymer are referred to as a block including a first repeating unit (a first block), a block including a second repeating unit (a second block), and a block including a third repeating unit (a third block). The first block including the first repeating unit may have a weight average molecular weight of 10,000 Daltons or greater, in a range of about 10,000 Daltons to about 500,000 Daltons, or for example, about 15,000 Daltons to about 400,000 Daltons, or about 20,000 to about 350,000 Daltons. A content of the first block including the first repeating unit may be in a range of about 20 parts by weight to about 50 parts by weight, or about 20 parts by weight to about 40 parts by weight, or for example, about 22 parts to about 30 parts by weight, based on 100 parts by weight of the total weight of the block copolymer. When such a polymer block is used, a protective film may have good mechanical properties, e.g., improved strength. The second block including the second repeating unit may have a weight average molecular weight of 10,000 Daltons or greater, in a range of about 10,000 Daltons to about 500,000 Daltons, or for example, about 15,000 Daltons to about 400,000 Daltons, or about 20,000 Daltons to about 350,000 Daltons. When such a hard block having a weight average molecular weight within any of these ranges is used, the protective film may have improved ductility, elasticity, and strength characteristics.

The block copolymer may be at least one selected from a diblock copolymer (A-B) and a triblock copolymer (A-B-A' or B-A-B'). In a triblock copolymer including the first block, the second block, and the third block, a total content of the first block and the third block may be in a range of about 20 parts by weight to about 35 parts by weight, or for example, about 20 parts by weight to about 33 parts by weight, or about 22 parts by weight to about 30 parts by weight, and a content of the second block may be in a range of about 65 parts to about 80 parts by weight, or about 67 parts by weight to about 79 parts by weight, or for example about 70 parts to about 78 parts by weight, based on 100 parts by weight of the total weight of the block copolymer.

The organic particle of the composite electrolyte may include polyvinyl pyridine, polyvinyl cyclohexane, poly glycidyl acrylate, poly(2,6-dimethyl-1,4-phenylene oxide), polyolefin, poly(tertbutyl vinyl ether), poly(cyclohexyl vinyl ether), polyvinyl fluoride, a poly(styrene-maleic anhydride) copolymer, poly(glycidyl methacrylate), polyacrylonitrile, a polymeric ionic liquid (PIL), or a combination thereof.

The organic particle of the composite electrolyte may include a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(methylacrylate-divinylbenzene) copolymer, a poly(ethyl acrylate-divinylbenzene) copolymer, a poly(pentyl acrylate-divinylbenzene) copolymer, a poly(butyl acrylate-divinylbenzene) copolymer, a poly(propyl acrylate-divinylbenzene) copolymer, a poly(pentyl acrylate-divinylbenzene) copolymer, a poly(acrylonitrile-butadiene-styrene) copolymer, or a combination thereof.

When the organic particle in the composite electrolyte includes a crosslinked polymer as described above, individual particles may be connected to each other due to the crosslinking between the particles, and as a result, the composite electrolyte may have improved mechanical strength. A degree of crosslinking of the composite electrolyte may be in a range of about 10% to about 30%, or for example, about 12% to about 28%, or about 12% to about 25%, based on the total composite electrolyte.

An average particle size of the particle in the composite electrolyte may be in a range of about 10 nanometers (nm) to about 100 micrometers (μm), about 20 nm to about 70 μm, about 30 nm to about 50 μm, about 40 nm to about 50 μm, about 50 nm to about 50 μm, about 0.1 μm to about 50 μm, about 0.3 µm to about 50 µm, about 0.3 µm to about 20 µm, about 0.5 µm to about 10 µm, about 1 µm to about 5 µm, or about 1.5 µm to about 5 µm. The particle may be a nanoparticle or a microparticle.

The particle included in the composite electrolyte may have a spherical shape, a microspherical shape, a rod shape, an oval shape, or a radial shape. When the particle has a spherical shape, the particle may be a microsphere having an average diameter, for example, in a range of about 0.1 µm to about 50 µm, about 0.3 µm to about 50 µm, about 0.3 µm to about 20 µm, about 0.5 µm to about 10 µm, or about 1 µm to about 5 µm. When the particle includes particles having different sizes, the particles may include a first particle having a large diameter and a second particle having a small diameter. For example, the particle may include a first particle having a size of about 8 µm as a large diameter particle and a second particle having a size of about 4 µm as a small diameter particle. In some embodiments, the particle may include a first particle having a size of about 3 µm as a large diameter particle and a second particle having a size of about 1.3 µm as a small diameter particle. A mixed weight ratio of the first (large diameter) particle to the second (small diameter) particle may be, for example, in a range of about 4:1 to about 9:1, or may be about 5:1, or about 6:1, or about 7:1, or about 8:1.

The lithium salt in the composite electrolyte may include, for example, LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_3$, LiPF$_3$(CF$_3$)$_3$, LiB(C$_2$O$_4$)$_2$, or a combination thereof.

The composite electrolyte may be a composite solid electrolyte that further includes a polymer. The polymer in the composite solid electrolyte may include polyethylene oxide (PEO), polyvinylidene fluoride (PVDF), polyvinylidene fluoride-hexafluoropropylene (PVDF-HFP), a poly(styrene-b-ethyleneoxide) block copolymer (PS-PEO), poly(styrene-butadiene), poly(styrene-isoprene-styrene), a poly(styrene-b-divinylbenzene) block copolymer, a poly(styrene-ethyleneoxide-styrene) block copolymer, or a combination thereof.

In the composite solid electrolyte, a content of the particle may be in a range of about 5 parts by weight to about 20 parts by weight, or about 5 parts by weight to about 18 parts by weight, or about 5 parts by weight to about 15 parts by weight, based on 100 parts by weight of the polymer. A content of the lithium salt may be in a range of about 5 parts by weight to about 40 parts by weight, or about 7 parts by weight to about 35 parts by weight, or about 10 parts by weight to about 30 parts by weight, based on 100 parts by weight of the polymer. However, the amounts of the particle and the lithium salt are not particularly limited thereto, and may be adjusted by the person of ordinary skill in the art without undue experimentation.

When the composite electrolyte includes the particle including the positively charged particle, the particle having a coordinate bond with a cation, or the combination thereof, the lithium ion mobility of the composite electrolyte may be greater than the lithium ion mobility of a composite electrolyte without the particle (particle-free composite electrolyte), greater than a lithium ion mobility of a composite electrolyte including a particle that is not positively charged, or a combination thereof.

According to another example embodiment, a protective film may include the composite electrolyte.

As the protective film includes the composite electrolyte including the positively charged particle, the particle having a coordinate bond with a cation, or a combination thereof, a side reaction between a lithium metal negative electrode and an electrolyte solution and/or anions of the electrolyte solution, which are positioned next to the protective film, may be effectively suppressed.

The protective film may have a tensile modulus of $10^6$ pascals (Pa) or greater, $10^7$ Pa or greater, or $10^8$ Pa or greater. For example, the protective film has a tensile modulus in a range of about $10^6$ Pa to about $10^{10}$ Pa, or about $10^7$ Pa to about $10^{10}$ Pa, or about $10^8$ Pa to about $10^{10}$ Pa, and as a result, the protective film may have excellent mechanical strength as well as elasticity. For example, the protective film may have a greater tensile modulus than lithium metal, and as a result, volumetric change of the lithium metal may be suppressed, and growth of lithium dendrites may be effectively suppressed.

The tensile modulus has the same meaning as Young's modulus. The tensile modulus may be measured by Dynamic Mechanical Analysis (DMA) using a DMA800 (available from TA Instruments Inc.). Protective film samples for the tensile modulus measurement may be prepared according to the ASTM standard D412 (Type V specimens). Variations in strain with respect to stress in the protective film may be measured at a temperature of about 25° C., a relative humidity of about 30%, and a rate of 5 millimeters per minute (mm/min). The tensile modulus may be calculated from the slope of a stress-strain curve thereof.

The particle in the protective film may have a chemically or physically crosslinked structure. The particle having a chemically or physically crosslinked structure may include, for example, an organic particle including a crosslinked polymer obtained from a polymer having a crosslinkable functional group, an inorganic particle having a crosslinked structure due to a crosslinkable functional group on a surface thereof, or the like, or may be a combination thereof. The crosslinkable functional group, which is involved in a crosslinking reaction, may be, for example, an acryl group, a methacryl group, a vinyl group, or the like.

A particle having a chemically crosslinked structure refers to a particle in which crosslinking has occurred using chemical methods (e.g., chemical agents) to facilitate the formation of a chemical bond between crosslinkable functional groups present in the material for forming the particle. A particle having a physically crosslinked structure refers to a particle in which crosslinking has occurred using physical methods, for example, by heating a polymer forming the particle until it reaches its glass transition ($T_g$) temperature. The cross-linking may occur within the particle itself, between adjacent particles in the protective layer, or may be a combination thereof.

The protective film may include a crosslinked product of a polymerizable oligomer between the particles.

The polymerizable oligomer refers to an oligomer having a crosslinkable functional group. A weight average molecular weight of the polymerizable oligomer may be 5,000 Daltons or less, for example, 2,000 Daltons or less, 1,000 Daltons or less, in a range of about 200 Daltons to about 1,000 Daltons, or about 200 Daltons to about 750 Daltons, or about 200 Daltons to about 500 Daltons. When a polymerizable oligomer has a weight average molecular weight within any of the above-described ranges, the polymerizable oligomer may be in a liquid state or in a state that allows the polymerizable oligomer to be dissolved and easily injected into a solvent. Such a polymerizable oligomer may have a low viscosity characteristics in a range of about 3 centipoise (cP) to about 50 cP, or about 3 cP to about 30 cP, or about 3 cP to about 20 cP. When a composition including a polymerizable oligomer having a viscosity within the above-described ranges is used, a process of injecting into and filling a space between particles of a protective film may be easily carried out, thereby manufacturing a protective film having a high strength.

A weight average molecular weight of the crosslinked material of the polymerizable oligomer may be in a range of about 10,000 Daltons to about 300,000 Daltons, or about 10,000 Daltons to about 300,000 Daltons, or about 15,000 Daltons to about 275,000 Daltons, and a degree of crosslinking of the crosslinked material of the polymerizable oligomer may be, for example, 90% or greater, or for example, in a range of about 90% to about 100%.

The polymerizable oligomer may include diethylene glycol diacrylate (DEGDA), triethylene glycol diacrylate (TEGDA), tetraethylene glycol diacrylate (TTEGDA), polyethylene glycol diacrylate (PEGDA), dipropylene glycol diacrylate (DPGDA), tripropylene glycol diacrylate (TPGDA), ethoxylated trimethylolpropane triacrylate (ETPTA), acrylate-functionalized ethylene oxide, 1,6-hexanediol diacrylate, ethoxylated neopentyl glycol diacrylate (NPEOGDA), propoxylated neopentyl glycol diacrylate (NPPOGDA), allyl methacrylate (ALMA), trimethylol propane triacrylate (TMPTA), trimethylol propane trimethacrylate (TMPTMA), pentaerythritol triacrylate (PETA), ethoxylated/propoxylated trimethylolpropane triacrylate (TMPEOTA)/(TMPPOTA), glyceryl propoxylated triacrylate (GPTA)/(GPPOTA), tris(2-hydroxyethyl) isocyanurate triacrylate (THEICTA), pentaerythritol tetraacrylate (PETTA), dipentaerythritol pentaacrylate (DPEPA), or a combination thereof.

The polymerizable oligomer and a crosslinked material of the polymerizable oligomer prepared therefrom may have ionic conductivity. When a polymerizable oligomer and a crosslinked material of the polymerizable oligomer have ionic conductivity, the ionic conductivity of the protective film may further improve.

A content of the crosslinked material of the polymerizable oligomer in the protective film may be in a range of about 10 parts by weight to about 50 parts by weight, or about 15 parts by weight to about 45 parts by weight, or for example, about 20 parts by weight to about 40 parts by weight, based on 100 parts by weight of the particle. When a content of the crosslinked material of the polymerizable oligomer is within any of these ranges, the protective film may have excellent mechanical properties.

The protective film may include a liquid electrolyte. When the protective film includes a liquid electrolyte, the liquid electrolyte may form an ion conducting path so that the conductivity of the negative electrode may improve. Accordingly, a lithium metal battery having a stable cycle characteristics may be obtained. For example, the liquid electrolyte may be disposed on a protective film in a solid state, and thus the protective film may be impregnated with the liquid electrolyte to thereby obtain a protective film including a liquid electrolyte.

The liquid electrolyte may include an organic solvent, a lithium salt, or a combination thereof. The liquid electrolyte may occupy about 30 volume percent (%) to about 60 volume % of the total volume of the protective film. For example, the liquid electrolyte may occupy 35 volume % to about 55 volume %, or about 40 volume % to about 50 volume % of the total volume of the protective film.

The lithium salt included in the protective film may be, for example, LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_3$, LiPF$_3$(CF$_3$)$_3$, LiB(C$_2$O$_4$)$_2$, or a combination thereof. A content of the lithium salt of the protective film may be in a range of about 10 parts by weight to about 70 parts by weight, about 20 parts by weight to about 60 parts by weight, or about 20 parts by weight to about 50 parts by weight, based on 100 parts by weight of the particle. When the content of the lithium salt is within any of these ranges, the protective film may have good ion conductivity.

The organic solvent included in the protective film may include a carbonate compound, a glyme compound, a dioxolane compound, or a combination thereof. For example, the carbonate compound may include ethylene carbonate, propylene carbonate, dimethyl carbonate, fluoroethylene carbonate, diethyl carbonate, or ethyl methyl carbonate, or a combination thereof. The glyme compound may include, for example, poly(ethylene glycol)dimethyl ether (PEGDME; polyglyme), tetra(ethylene glycol)dimethyl ether (TEGDME; tetraglyme), tri(ethylene glycol)dimethyl ether (triglyme), poly(ethylene glycol)dilaurate (PEGDL), poly (ethylene glycol)monoacrylate (PEGMA), poly(ethylene glycol)diacrylate (PEGDA), or a combination thereof. The dioxolane compound may include, for example, 3-dioxolane, 4,5-diethyl-1,3-dioxolane, 4,5-dimethyl-1,3-dioxolane, 4-methyl-1,3-dioxolane, 4-ethyl-1,3-dioxolane, or a combination thereof. Examples of the organic solvent include 2,2-dimethoxy-2-phenyl acetophenone, dimethyl ether (DME), 1,2-dimethoxyethane, 1,2-diethoxyethane, tetrahydrofuran (THF), γ-butyrolactone, 1,1,2,2-tetrafluoroethyl 2,2,3,3-tetrafluoropropyl ether, or a combination thereof.

The organic solvent may include ethylene carbonate, propylene carbonate, dimethyl carbonate, diethyl carbonate, ethyl methyl carbonate, fluoroethylene carbonate, γ-butyrolactone, dimethoxyethane, diethoxyethane, diethylene glycol dimethyl ether, triethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, tetraethylene glycol, 1,1,2,2-tetrafluoroethyl 2,2,3,3-tetrafluoropropyl ether, or a combination thereof.

The protective film may further include an ionic liquid, a metal salt including a Group 1 or 2 element, and a nitrogen-containing additive, boron nitride, an ion conductive polymer, or a combination thereof.

The term "ionic liquid" refers to a salt in a liquid state at room temperature or a room temperature molten salt having a melting point of room temperature or less and consisting of ions. The ionic liquid may be a compound including: a cation including an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, or a combination thereof; and an anion including BF$_4^-$, PF$_6^-$, AsF$_6^-$, SbF$_6^-$, AlCl$_4^-$, HSO$_4^-$, ClO$_4^-$, CH$_3$SO$_3^-$, CF$_3$CO$_2^-$, Cl$^-$, Br$^-$, I$^-$, SO$_4^{2-}$, CF$_3$SO$_3^-$, (FSO$_2$)$_2$N$^-$, (C$_2$F$_5$SO$_2$)$_2$N$^-$, (C$_2$F$_5$SO$_2$)(CF$_3$SO$_2$)N$^-$, (CF$_3$SO$_2$)$_2$N$^-$, or a combination thereof.

For example, the ionic liquid may include N-methyl-N-propyl pyrrolidinium bis(trifluoromethanesulfonyl)imide, N-butyl-N-methyl pyrrolidinium bis(3-trifluoromethylsulfonyl)imide, 1-butyl-3-methylimidazolium bis(trifluoromethylsulfonyl)imide, 1-ethyl-3-methylimidazolium bis(trifluoromethylsulfonyl)imide, or a combination thereof.

A content of the ionic liquid in the protective film may be in a range of about 5 parts by weight to about 40 parts by weight, or about 10 parts by weight to about 30 parts by weight, or about 10 parts by weight to about 20 parts by weight, based on 100 parts by weight of the particle. When the content of the ionic liquid is within any of these ranges, the protective film may have improved ion conductivity and improved mechanical properties.

When the protective film includes an ionic liquid and a lithium salt, a mole ratio (IL/Li) of the ionic liquid (IL) to lithium ions (Li) may be in a range of about 0.1 to about 2, for example, about 0.2 to about 1.8, or for example, about 0.4 to about 1.5. When the mole ratio of the ionic liquid to lithium ions is within any of these ranges, the protective film may have high lithium ion mobility, high ion conductivity, and improved mechanical properties to effectively suppress growth of lithium dendrite on a surface of the negative electrode.

The metal salt including a Group 1 or 2 element may be a metal salt including Cs, Rb, K, Ba, Sr, Ca, Na, Mg, or a combination thereof.

The nitrogen-containing additive may include an inorganic nitrate, an organic nitrate, an inorganic nitrite, an organic nitrite, an organic nitro compound, an organic nitroso compound, a N—O compound, a lithium nitride ($Li_3N$), or a combination thereof.

A metal salt containing a Group 1 or 2 element, a nitrogen-containing additive, or a combination thereof, may be insoluble in an organic solvent of a liquid electrolyte. Thus, the metal salt containing a Group 1 or 2 element and the nitrogen-containing additive may be electrochemically stable on a surface of a lithium metal negative electrode. Mobility of the metal salt containing a Group 1 or 2 element and the nitrogen-containing additive is limited; thus, lithium ion mobility in a protective film including the metal salt and the nitrogen-containing additive may not be substantially affected. The metal of the metal salt containing a Group 1 or 2 element has a relatively larger atom size than lithium and thus may have a steric hindrance effect in the protective film. Without being limited by theory, it is believed that due to this steric hindrance, it may be possible to suppress growth of lithium dendrites on a surface of the lithium metal negative electrode. A metal cation (for example, cesium (Cs) or rubidium (Rb) ions) in the metal salt containing a Group 1 or 2 element may exhibit an effective reduction potential below the reduction potential of lithium ions and thus may form a positively charged electrostatic shield around the initial growth tip of protuberances formed on a surface of the lithium metal negative electrode, without any reduction or deposition of the metal salt during lithium deposition. The positively charged electrostatic shield may effectively suppress growth of lithium dendrites on a surface of the lithium metal negative electrode. In order for the metal salt containing a Group 1 or 2 element to have an effective reduction potential below the reduction potential of lithium ions, the content of the metal salt containing a Group 1 or 2 element may be in a range of about 0.1 parts by weight to about 100 parts by weight, or about 1 part by weight to about 75 parts by weight, or about 10 parts by weight to about 50 parts by weight, based on 100 parts by weight of the particle.

The polymeric ionic liquid which may be added to the protective film-forming composition may be, for example, a polymerization product of ionic liquid monomers, or a polymeric compound. The polymeric ionic liquid is highly dissoluble in an organic solvent, and thus may further improve the ion conductivity of a protective film when added to the protective film-forming composition.

When the polymeric ionic liquid is prepared by polymerization of ionic liquid monomers, a resulting product from the polymerization reaction may be washed and dried, followed by an anionic substitution reaction to have appropriate anions that may improve solubility in an organic solvent.

The polymer ionic liquid may include a repeating unit including: an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, or a combination thereof; and $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF3SO2)2N—$, $(FSO2)2N—$, Cl—, Br—, I—, SO4-, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

The ionic liquid monomer used in preparing the polymer ionic liquid may have a functional group that is polymerizable with a vinyl group, an allyl group, an acrylate group, or a methacrylate group and may have a cation including an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, or a combination thereof, and at least one of the above-listed anions.

Examples of the ionic liquid monomer include 1-vinyl-3-ethylimidazolium bromide and compounds represented by Formula 19 or 20:

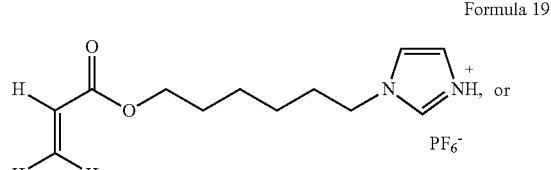

Formula 19

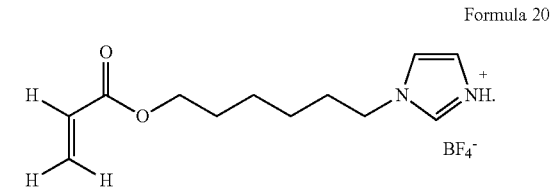

Formula 20

For example, the polymeric ionic liquid may be a compound represented by Formula 21 or a compound represented by Formula 22:

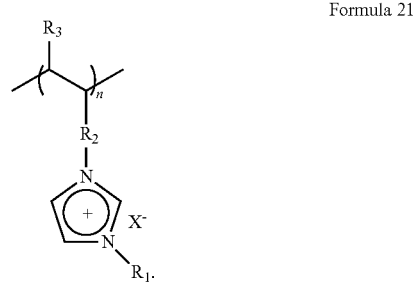

Formula 21

In Formula 21, $R_1$ and $R_3$ may each independently be hydrogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_2$-$C_{30}$ heteroaryl group, a substituted or unsubstituted $C_4$-$C_{30}$ carbocyclic group; $R_2$ may be a single bond, a $C_1$-$C_3$ alkylene group, a $C_6$-$C_{30}$ arylene group, a $C_2$-$C_{30}$ heteroarylene group, or a $C_4$-$C_{30}$ carbocyclic group; $X^-$ may be an anion of an ionic liquid; and n may be in a range of about 500 to about 2,800.

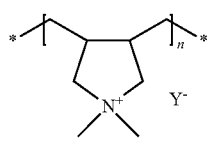

Formula 22

In Formula 22, $Y^-$ is defined the same as $X^-$ in Formula 21, and n may be in a range of about 500 to about 2,800.

In Formula 22, $Y^-$ may be, for example, bis(trifluoromethanesulfonyl)imide (TFSI$^-$), bis(fluoromethanesulfonyl)imide, $BF_4^-$, or $CF_3SO_3^-$.

The polymer ionic liquid may include, for example, a cation including poly(1-vinyl-3-alkylimidazolium), poly(1-allyl-3-alkylimidazolium), or poly(1-(methacryloxy-3-alkylimidazolium) and an anion including $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, or $(CF_3SO_2)(CF_3CO)N^-$. A combination comprising at least one of the foregoing may also be used.

The compound represented by Formula 22 may be polydiallyldimethylammonium bis(trifluoromethanesulfonyl) imide.

In some embodiments, the polymeric ionic liquid may include a low-molecular weight polymer, a thermally stable ionic liquid, and a lithium salt. The low-molecular weight polymer may have an ethylene oxide chain. The low-molecular weight polymer may be a glyme. For example, the glyme may include polyethylene glycol dimethylether (polyglyme), tetraethylene glycol dimethyl ether (tetraglyme), triethylene glycol dimethylether (triglyme), or a combination thereof. A weight average molecular weight of the low-molecular weight polymer may be in a range of about 75 Daltons to about 2,000 Daltons, for example, about 250 Daltons to about 500 Daltons. The thermally stable ionic liquid may be the same as those listed above in conjunction with the above-described ionic liquid. The lithium salt may be any suitable compound of which an alkali metal is lithium from among the aforementioned lithium salts.

The protective film may further include an oligomer. For example, the oligomer in the protective film may include polyethylene glycol dimethyl ether, polyethylene glycol diethyl ether, and a combination thereof. A weight average molecular weight of the oligomer may be in a range of about 200 Daltons to about 2,000 Daltons, or about 300 Da to about 1800 Da, or about 400 Da to about 1500 Da, and a content of the oligomer may be in a range of about 5 parts by weight to about 50 parts by weight, or about 10 parts by weight to about 40 parts by weight, or about 10 parts by weight to about 30 parts by weight, based on 100 parts by weight of the particle of the protective film. When such an oligomer is added, the protective film may have improved film formability, mechanical properties, and ion conductivity.

An ion conductivity of the protective film may be, at a temperature of about 25° C., $1 \times 10^{-4}$ Siemens per centimeter (S/cm) or greater, $5 \times 10^{-4}$ S/cm or greater, or $1 \times 10^{-3}$ S/cm or greater.

The nitrogen-containing additive included in the protective film may include an inorganic nitrate, an organic nitrate, an inorganic nitrite, an organic nitrite, an organic nitro compound, an organic nitroso compound, a N—O compound, a lithium nitride ($Li_3N$), or a combination thereof.

For example, the inorganic nitrate may include lithium nitrate, potassium nitrate, cesium nitrate, barium nitrate, ammonium nitrate, or a combination thereof. For example, the organic nitrate may include dialkyl imidazolium nitrate, guanidine nitrate, ethyl nitrate, propyl nitrate, butyl nitrate, pentyl nitrate, octyl nitrate, or a combination thereof. For example, the organic nitrite may include ethyl nitrite, propyl nitrite, butyl nitrite, pentyl nitrite, octyl nitrite, or a combination thereof.

For example, the organic nitroso compound may include nitromethane, nitropropane, nitrobutane, nitrobenzene, dinitrobenzene, nitrotoluene, dinitrotoluene, nitropyridine, or a combination thereof. For example, the N—O compound may include pyridine N-oxide, alkylpyridine N-oxide, tetramethyl piperidine N-oxyl (TEMPO), or a combination thereof.

In some embodiments, the nitrogen-containing additive in the protective film may include $LiNO_3$, $Li_3N$, or a combination thereof, and the metal salt containing a Group 1 or 2 element in the protective film may include cesium bis (trifluoromethylsulfonyl)imide (CsTFSI), $CsNO_3$, $CsPF_6$, CsFSI, $CsAsF_6$, $CsClO_4$, $CsBF_4$, or a combination thereof. For example, the metal salt may be CsTFSI.

An amount of the metal salt containing a Group 1 or 2 element and the nitrogen-containing additive in the protective film may be in a range of about 0.1 parts by weight to about 100 parts by weight, for example, about 0.1 parts by weight to about 50 parts by weight, or about 0.1 parts by weight to about 30 parts by weight, based on 100 parts by weight of the particle. When the content of the metal salt containing a Group 1 or 2 element and the nitrogen-containing additive is within any of these ranges, the lithium metal battery may have a lithium dendritic growth suppression effect, a reduced interfacial resistance between a surface of the lithium metal negative electrode and the protective film, and improved lithium ion mobility.

The protective film may include, for example, a metal salt containing a Group 1 or 2 element other than the composite electrolyte. A content of the metal salt containing a Group 1 or 2 element may be in a range of about 0.1 parts by weight to about 100 parts by weight, or about 0.1 parts by weight to about 50 parts by weight, or for example, about 0.1 parts by weight to about 30 parts by weight, based on 100 parts by weight of the particle.

The protective film may include, for example, a nitrogen-containing additive other than the composite electrolyte. An amount of the nitrogen-containing additive may be in a range of about 0.1 parts by weight to about 100 parts by weight, or for example, or about 0.1 parts by weight to about 50 parts by weight or about 0.1 parts by weight to about 30 parts by weight, based on 100 parts by weight of the particle.

The protective film may include, for example, a metal salt containing a Group 1 or 2 element and a nitrogen-containing additive other than the composite electrolyte. A content of the metal salt containing a Group 1 or 2 element may be in a range of about 0.01 part by weight to about 99.99 parts by weight, or about 0.1 part by weight to about 50 parts by weight, or for example, about 0.1 part to about 30 parts by weight, and a content of the nitrogen-containing additive may be in a range of about 0.01 part by weight to about 99.99 parts by weight, or for example, or about 0.1 part by weight to about 50 parts by weight, or about 0.1 part by weight to about 30 parts by weight, based on 100 parts by weight of the particle. A mixed weight ratio of the metal salt containing a Group 1 or 2 element to the nitrogen-containing additive in the protective film may be in a range of about 1:9 to about 9:1, about 1:5 to about 5:1, or about 1:2 to about 2:1, or in some embodiments, about 1:1. When the mixed weight ratio of the metal salt containing a Group 1 or 2 element to the nitrogen-containing additive is within any of these ranges, due to good deposition density on a surface of the lithium metal negative electrode and improved lithium ion mobility characteristics in the electrolyte, the lithium metal battery may have improved rate capability and lifespan characteristics.

The protective film may have excellent mechanical strength and flexibility, thus effectively suppressing formation of lithium dendrite. An ion conductive thin film having a high ion conductivity may be between a lithium metal negative electrode and a protective film. The ion conductive thin film may increase ion conductivity and lithium ion mobility of the protective film; thus an interfacial resistance between the lithium metal negative electrode and the protective film may decrease. The ion conductive thin film may include, for example, lithium nitride ($Li_3N$).

The protective film may also chemically improve a deposition/dissolution process of lithium ions to thereby improve deposition morphology of the lithium metal negative electrode, as compared with a case of forming a conventional protective film, and consequently increase deposition density on a surface of the lithium metal negative electrode and lithium ion mobility (or transference number). In addition, as described above, a metal salt containing a Group 1 or 2 element, a nitrogen-containing additive, or a combination thereof may be confined to the protective film on a surface of the lithium metal negative electrode, and thus may be unlikely to be dispersed in the liquid electrolyte or to migrate toward the positive electrode and react with the positive electrode. In conclusion, it may be possible to manufacture a lithium metal battery with high rate characteristics and lifespan characteristics.

According to another example embodiment, a protected negative electrode may include a lithium metal negative electrode including lithium metal or a lithium metal alloy; and a protective film on the lithium metal negative electrode.

When the protected negative electrode includes the protective film, the volumetric change of the lithium metal negative electrode and lithium dendritic growth may be suppressed.

Referring to FIGS. 4A to 4D, the structure of a negative electrode for a lithium metal battery according to one or more embodiments will be described in detail.

Referring to FIG. 4A to 4D, a particle 13 of a protective film 12 may have a microspherical shape.

Figure 4A:
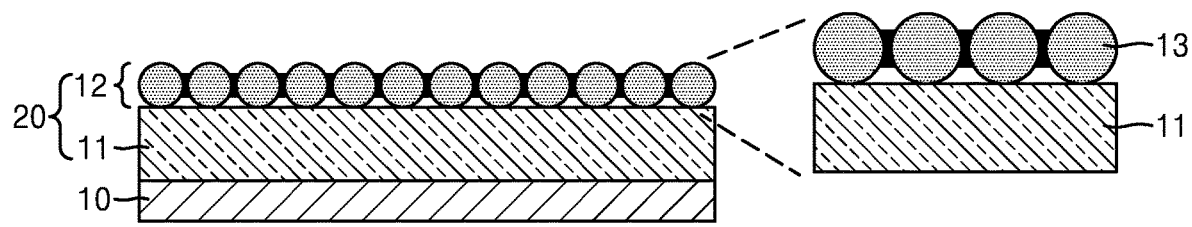
FIGS. 4A to 4D are each a schematic view illustrating an embodiment of a structure of a protected negative electrode.

Referring to FIG. 4A, a protected negative electrode 20 includes a lithium metal electrode 11 and the protective film 12 on the lithium metal electrode 11, the lithium metal electrode 11 being on a current collector 10 and including lithium metal or a lithium metal alloy. The protective film 12 includes the particle 13. Gaps (i.e., space) are present between the particles 13, and ions may be transported through these gaps. Thus, when such a protective film 12 is used, the negative electrode may have improved ion conductivity. Furthermore, the gaps, for example, the pore structure between the particles 13, may provide a space for lithium dendritic growth and act as a guide for growth of lithium dendrites. Although it is not illustrated in the drawings, as the particle 13 is positively charged, anions may be confined to the vicinity of the particle 13, and thus migration of anions may be suppressed and/or prevented. Without being limited by theory it is understood that this consequently results in an increase of lithium ion migration and prevention of a side reaction between anions and the lithium metal electrode.

The lithium metal alloy 11 may include lithium metal, a metal/metalloid alloyable with lithium metal, an oxide thereof, or a combination thereof. Examples of the metal/metalloid alloyable with lithium metal or an oxide thereof include Si, Sn, Al, Ge, Pb, Bi, Sb, a Si—Y alloy (wherein Y is an alkaline metal, an alkaline earth metal, a Group 13 element, a Group 14 element, a Group 15 element, a Group 16 element, a transition metal, a rare earth element, or a combination thereof, except for Si), a Sn—Y alloy (wherein Y is an alkaline metal, an alkaline earth metal, a Group 13 element, a Group 14 element, a Group 15 element, a Group 16 element, a transition metal, a rare earth element, or a combination thereof, except for Sn), $MnO_x$ (wherein $0<x\leq2$), or a combination thereof.

Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof. Examples of the oxide of a metal/metalloid alloyable with lithium metal include a lithium titanium oxide, a vanadium oxide, a lithium vanadium oxide, $SnO_2$, and $SiO_x$ (wherein $0<x<2$).

Figure 4B:
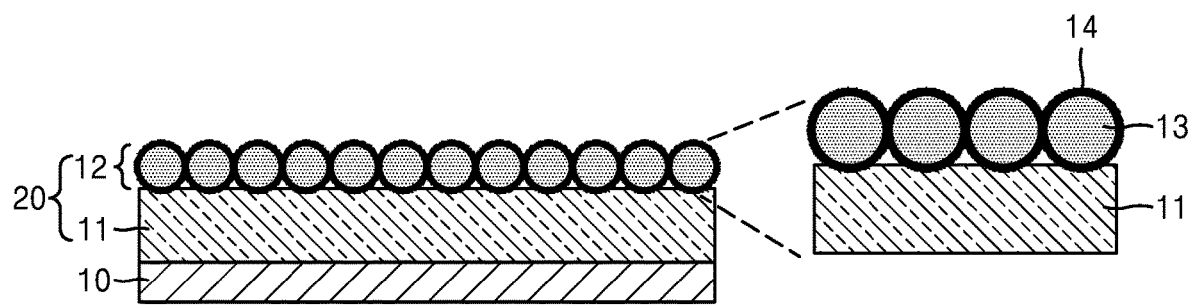

Referring to FIG. 4B, an ion conductive polymer 14 surrounds the particle 13. Although it is not illustrated in the drawings, a liquid electrolyte may be present in the gaps (i.e., space) between the particles 13. The ion conductive polymer 14 included in the protective film 12 may improve the strength of the protective film 12 and serve as a binder.

An amount of the ion conductive polymer may be 10 parts by weight or less, 5 parts by weight or less, or 2 parts by weight or less, based on 100 parts by weight of the particle. A content of the ion conductive polymer may be in a range of about 1 part by weight to about 10 parts by weight, about 1 part by weight to about 5 parts by weight, or about 1 part by weight to about 2 parts by weight, based on 100 parts by weight of the particle. When an amount of the ion conductive polymer is within any of these ranges, the protective film may have excellent mechanical strength and consequently may effectively suppress lithium dendritic growth.

The ion conductive polymer may serve as a binder in the protective film which helps a particle be fixed on the lithium metal electrode. The ion conductive polymer may be any suitable material that may improve mechanical strength of the protective film. The ion conductive polymer may be, for example, any suitable ion conductive polymer, generally used in a lithium metal battery, including a homopolymer, a copolymer, a crosslinked polymer, or a combination thereof.

The copolymer may be a block copolymer, a random copolymer, a graft copolymer, an alternating copolymer, or a combination thereof.

The crosslinked polymer may be any polymer that has a linking bond between two different polymer chains. For example, the crosslinked polymer may be a polymer formed by crosslinking polymers having a crosslinkable functional group. The crosslinked polymer may be a crosslinked material obtained from a copolymer containing a repeating unit having a crosslinkable functional group.

The crosslinked polymer may be a crosslinked material of a block copolymer including a polyethylene oxide block and a polystyrene block having an acrylate functional group; or a crosslinked material of a compound including at least one selected from a ($C_1$-$C_9$ alkyl) (meth)acrylate, a ($C_2$-$C_9$ alkenyl) (meth)acrylate, a ($C_1$-$C_{12}$ glycol) diacrylate, a poly ($C_2$-$C_6$ alkylene glycol) diacrylate, and a polyol polyacrylate. The $C_1$-$C_9$ alkyl (meth)acrylate may be, for example, hexyl acrylate, 2-ethyl hexyl acrylate or allyl methacrylate.

Examples of the glycol diacrylate include 1,4-butanediol diacrylate, 1,3-butylene glycol diacrylate, a 1,6-hexanediol diacrylate, an ethylene glycol diacrylate, neopentyl glycol diacrylate, or a combination thereof. Examples of the poly (alkylene glycol) diacrylate include diethylene glycol diacrylate, triethylene glycol diacrylate, tetraethylene glycol diacrylate, tripropylene glycol diacrylate, polyethylene glycol diacrylate, polypropylene glycol diacrylate, or a combination thereof.

Examples of the polyol polyacrylate include trimethylol propane triacrylate, pentaerythritol tetraacrylate, or pentaerythritol triacrylate, or a combination thereof.

The ion conductive polymer may be, for example, a polystyrene homopolymer or copolymer, a block copolymer including a styrene-based repeating unit, or a combination thereof. For example, the ion conductive polymer may include polystyrene homopolymer, a poly(styrene-divinylbenzene) block copolymer, a poly(styrene-isoprene) block copolymer, a poly(styrene-isoprene-styrene) block copolymer, a poly(styrene-butadiene) block copolymer, a poly (styrene-butadiene-styrene) block copolymer, a poly(styrene-ethylene-butylene-styrene) block copolymer, a poly (styrene-methylmethacrylate) block copolymer, a poly (styrene-acrylonitrile) block copolymer, a poly(styrene-vinylpyridine) block copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly($C_1$-$C_9$ alkyl) methacrylate-butadiene-styrene) copolymer, a poly(styrene-($C_1$-$C_9$ alkyl) acrylate) copolymer, poly (acrylonitrile-styrene-acrylate) copolymer, or a combination thereof.

Examples of the poly($C_1$-$C_9$ alkyl) methacrylate-butadiene-styrene) copolymer include a polymethacrylate-butadiene-styrene) copolymer. Examples of the poly(styrene-($C_1$-$C_9$ alkyl) acrylate) copolymer include a poly(styrene-acrylate) copolymer.

The poly(styrene-divinylbenzene) copolymer may be represented by Formula 23:

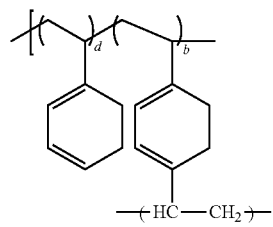

Formula 23

In Formula 1, a and b as mole fractions may each independently be in a range of about 0.01 to about 0.99, wherein a sum of a and b may be equal to 1. In Formula 1, a may be, for example, in a range of about 0.95 to about 0.99, for example, about 0.96 to about 0.99, or for example, about 0.98 to about 0.99, and b may be, for example, in a range of about 0.01 to about 0.05, for example, about 0.01 to about 0.04, or for example, about 0.01 to about 0.02.

The poly(styrene-divinylbenzene) copolymer may be represented by Formula 23a:

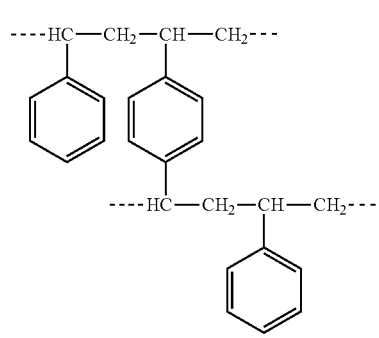

Formula 23a

The poly(styrene-divinylbenzene) copolymer may be represented by Formula 23b:

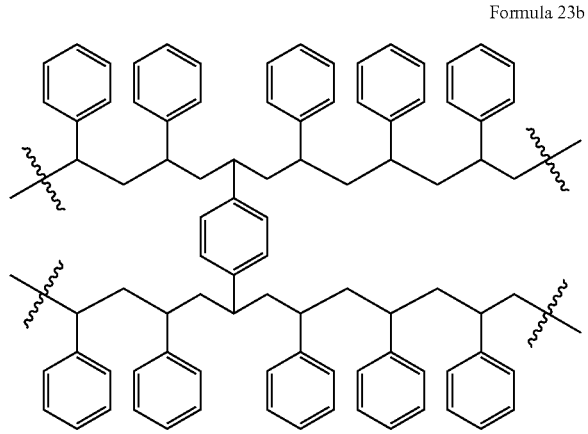 [SMILES: *CC(CC(CC(CC(CC(CC(*)c1ccccc1)c1ccccc1)c1ccc(C(CC(CC(*)c2ccccc2)c2ccccc2)CC(CC(CC(C*)c2ccccc2)c2ccccc2)c2ccccc2)cc1)c1ccccc1)c1ccccc1)c1ccccc1]

Formula 23b

The poly(acrylonitrile-butadiene-styrene) copolymer may be represented by Formula 24:

Formula 24

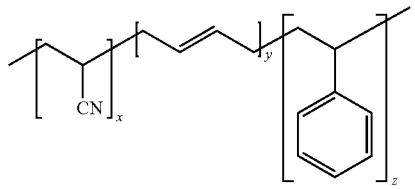

In Formula 24, x, y, and z as mole fractions may each independently be in a range of about 0.01 to about 0.99, wherein a sum of x, y, and z may be equal to 1. In Formula 24, x may be in a range of about 0.1 to about 0.35, y may be in a range of about 0.05 to about 0.55, and z may be in a range of about 0.2 to about 0.7. For example, x may be in a range of about 0.15 to about 0.35, y may be in a range of about 0.05 to about 0.3, and z may be in a range of about 0.4 to about 0.6.

The poly(styrene-divinylbenzene) copolymer represented by Formula 23 and the poly(acrylonitrile-butadiene-styrene) copolymer represented by Formula 24 may each have a degree of polymerization in a range of about 2 to about 5,000, or for example, about 2 to about 2,500, or about 5 to about 1,000.

For example, the poly(styrene-divinylbenzene) copolymer represented by Formula 23 and the poly(acrylonitrile-butadiene-styrene) copolymer represented by Formula 24 may each be a block copolymer.

Referring to FIGS. 4A and 4B, the protective film 12 may be on the lithium metal negative electrode 11, and include an assembly of the particles 13 as a monolayer. The particles 13 may be a monodisperse layer with substantially no particle agglomeration. The particles 13 may be regularly or irregularly arranged on the lithium metal negative electrode 11. The particles 13 may be arranged periodically or non-periodically on the lithium metal negative electrode 11. As shown in FIG. 4B, the ion conductive polymer 14 may surround the particle.

Figure 4C:
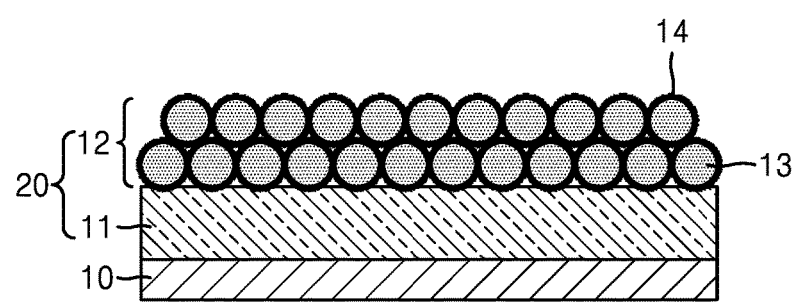

Referring to FIG. 4C, the protective film 12 is on the lithium electrode negative electrode 11, and has a stacked structure of two monolayers of the particle 13. The ion conductive polymer 14 surrounds the particle 13. That is, the protective film 12 may include a stacked assembly of a plurality of particle 13 monolayers on the lithium metal negative electrode 11. The number of stacked layers is dependent upon a desired final thickness of the protective film 12. For example, the number of the stacked layers may be in a range of about 2 to about 100, or about 2 to about 50, or about 5 to about 50.

Figure 4D:
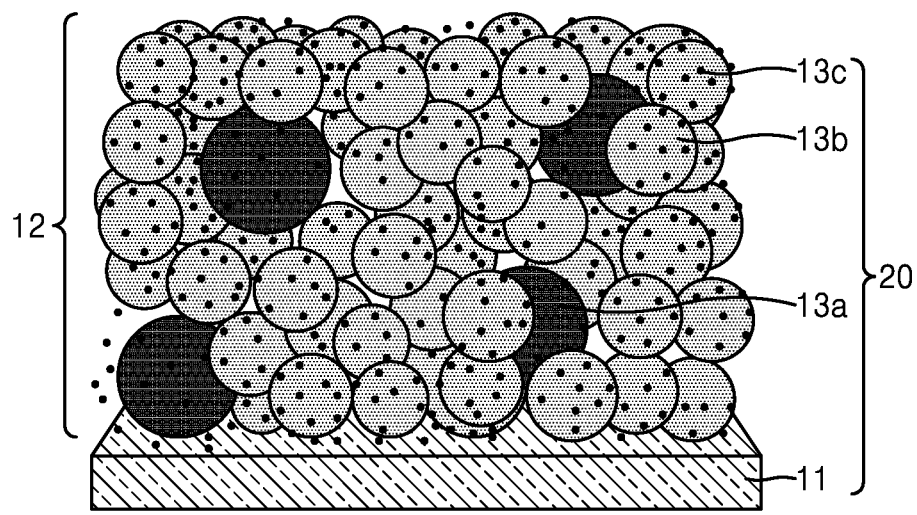

Referring to FIG. 4D, in a protected negative electrode 20, the protective film 12 may have a multi-layered structure including a mixture of particles of different sizes 13a, 13b, and 13c. When the protective film 12 has a multi-layered structure including a mixture of particles of different sizes 13a, 13b, and 13c, a porosity of the protective film 12 may decrease, and/or a packing density of the protective film 12 may increase. Thus, space for dendritic growth may decrease, or a contact area between an electrolyte and the lithium metal negative electrode 11 may decrease. Consequently, dendritic growth may be effectively suppressed.

The particle 13 of the protective film 12 may include, for example, a poly(styrene-divinylbenzene) copolymer. When the particles 13 in the protective film 12 are formed of a crosslinked polymer, the particles 13 may be covalently linked to one another. The particles 13 may have a structure in which the particles 13 are covalently linked to one another. Thus, the protective film 12 may form a high-strength network structure. A porosity of the protective film 12 may be in a range of about 25% to about 50%, for example, about 28% to about 48%, or for example, about 30% to about 45%. A pore size and porosity of the protective film 12 may be based on the size of the particle 13. In the protective film 12, substantially no agglomeration of the particles 13 may occur, so that the protective film 12 may have a uniform thickness. A thickness of the protective film 12 may be in a range of about 1 µm to about 10 µm, about 2 µm to about 9 µm, or about 3 µm to about 8 µm. A thickness deviation of the protective film 12 may be in a range of about 0.1 µm to about 4 µm, about 0.1 µm to about 3 µm, or about 0.1 µm to about 2 µm.

Figure 4E:
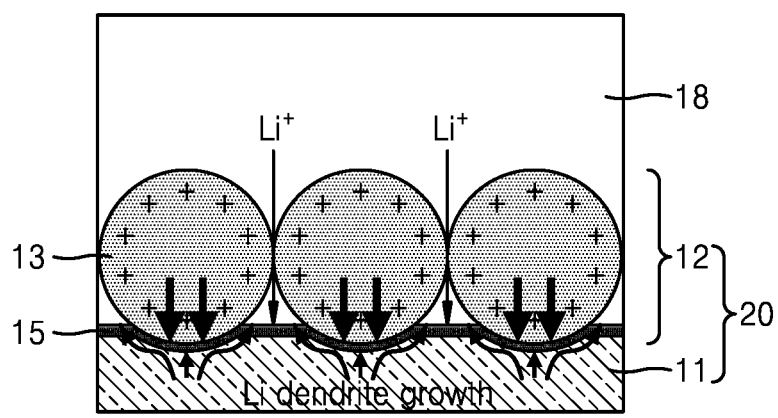
FIGS. 4E and 4F are each a schematic view illustrating a working principle for the suppression and guiding of lithium dendrite growth in an embodiment of a protective film on a negative electrode of a lithium battery.
Figure 4F:
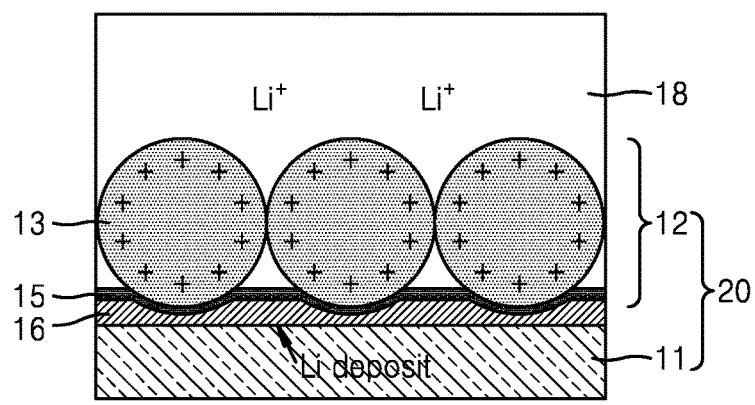

FIGS. 4E and 4F each an enlarged view of an interface between the protected negative electrode 20 and an electrolyte for illustrating operational effect of the protected negative electrode 20.

Referring to FIG. 4E, in the protected negative electrode 20, a solid electrolyte interface (SEI) 15 is on the lithium metal negative electrode 11, and the protective film 12 including the particle 13 is on the SEI 15. The gaps (i.e., spaces) between the particles 13 may be filled with the liquid electrolyte 18. The tensile modulus of the particle 13 is higher than the tensile modulus of the lithium metal negative electrode 11, and thus, the lithium metal negative electrode 11 and the SEI 15 may be more flexible than the particle 13. Accordingly, the particle 13 may press against the lithium metal negative electrode 11 and the SEI 15. Thus, a groove may be formed on the lithium metal negative electrode 11 and the SEI 15. The particle 13 may be, for example, a crosslinked poly(styrene-divinylbenzene) copolymer microsphere. Due to the force of the particle 13 on the lithium metal negative electrode 11 and the SEI 15, lithium dendritic growth from the lithium metal negative electrode 11 may be suppressed, and in addition, a lithium dendrite which does form may be guided to the gaps (i.e., space) between the particles 13.

Referring to FIG. 4F, after charging the battery, in the protected negative electrode 20, a lithium deposition layer 16 may be formed on the lithium metal negative electrode 11 by lithium deposition. Thus, the protected negative electrode 20 may have a structure in which the protective film 12 contains the SEI 13 and the particle 13 on the lithium deposition layer 16.

The protected negative electrode 20 including the protective film 12 including the particle, 13 may have a significantly increased lithium deposition density. Therefore, volumetric change, e.g., thickness change, of the protected negative electrode 20 may be suppressed. In addition, the protective film 12 may have a network structure and/or porous structure to thereby provide space for dendritic growth. Thus, irregular dendritic growth may be suppressed, and side products from a positive electrode may be effectively deposited. In addition, since the particle 13 included in the protective film 12 may be positively charged, anions may be localized or confined to the vicinity of the particle 13. Thus, migration of anions may be suppressed and/or prevented. Accordingly, a side reaction between the anions and the lithium metal negative electrode 11 may be suppressed, and a lithium ion transference number ($T_{Li+}$) may increase to thereby suppress lithium dendritic growth. Consequently, a lithium metal battery employing the protected negative electrode 20 may have improved lifespan and stability at a high temperature. For example, upon charging the battery, a lithium deposition density on a surface of the lithium metal electrode may be in a range of about 0.2 grams per cubic centimeter (g/cm$^3$) to about 0.4 g/cm$^3$, about 0.3 g/cm$^3$ to about 0.4 g/cm$^3$, about 0.3 g/cm$^3$ to about 0.35 g/cm$^3$, or about 0.32 g/cm$^3$ to about 0.35 g/cm$^3$.

Figure 4G:
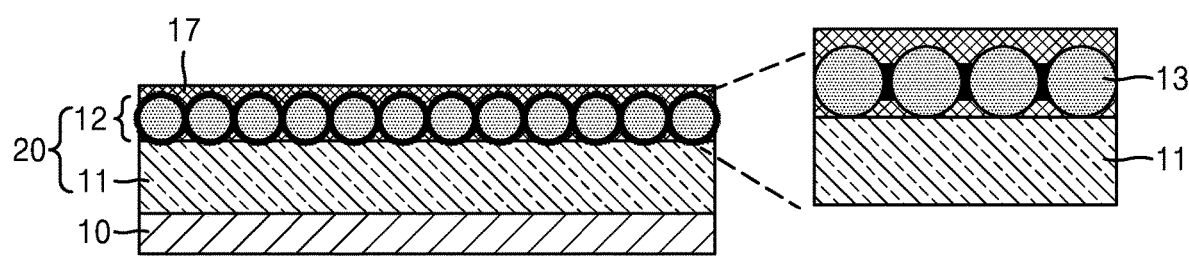
FIGS. 4G to 4I are each a schematic view illustrating an embodiment of a structure of a protected negative electrode.
Figure 4H:
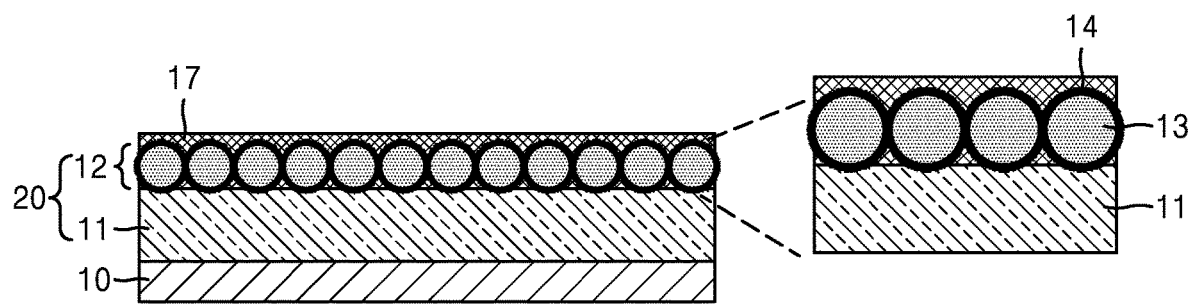
Figure 4I:
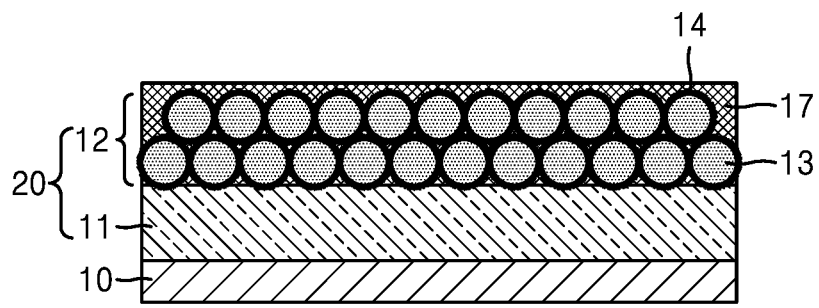

Referring to FIGS. 4G to 4I, a crosslinked product of a polymerizable oligomer 17 may be between the particles 13 in the protective film 12. The protected negative electrode 20 illustrated in FIGS. 4G to 4I corresponds to the protected negative electrode 20 illustrated in FIGS. 4A to 4C, but in which the gaps (i.e., space) between the particles 13 of the protective film 12 are filled with the crosslinked product of a polymerizable oligomer 17. Since the crosslinked product of a polymerizable oligomer 17 is present in the empty space between the particles 13, the protective film 12 may be formed as a single body. Consequently, the protective film 12 may have excellent mechanical properties. Therefore, when such a protective film 12 is used, it may be highly effective to suppress lithium dendritic growth on a surface of the protected negative electrode 20. Further, the lithium metal battery may also have improved lithium deposition density upon charging and discharging and improved conductivity. In the case that the crosslinked product of a polymerizable oligomer 17 is ionically conductive, ions may be transferred through the crosslinked material of a polymerizable oligomer 17. Therefore, the protected negative electrode 20 including the protective film 12 may have improved ion conductivity. In addition, since the particle 13 included in the protective film 12 is positively charged, a lithium ion transference number may be greatly increased.

According to another example embodiment, a lithium metal battery may include a positive electrode; a protected negative electrode including a lithium metal negative electrode including a lithium metal or a lithium metal alloy, and a protective film on the lithium metal negative electrode; and an electrolyte between the positive electrode and the protected negative electrode, wherein the protective film includes a composite electrolyte, including a particle comprising a positively charged particle, a particle that is positively charged by having a coordinate bond with a cation, or a combination thereof; and a lithium salt.

Figure 5A:
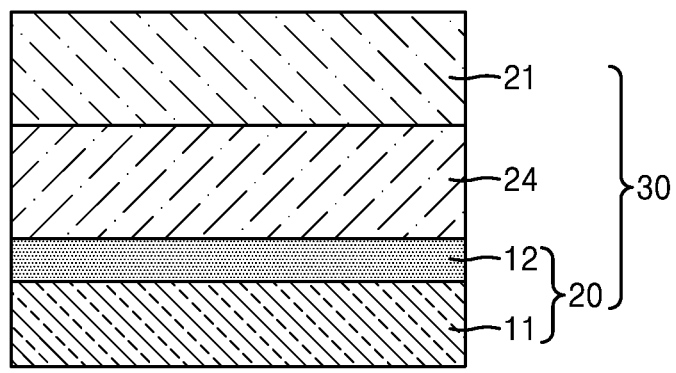
FIGS. 5A to 5G are each a schematic view illustrating a structure of various embodiments of a lithium battery.

Referring to FIG. 5A, a lithium metal battery 30 includes a positive electrode 21, a protected negative electrode 20, and an electrolyte 24 between the positive electrode 21 and the protected negative electrode 20. The protected negative electrode 20 may include the lithium metal negative electrode 11 and the protective film 12.

As the lithium metal battery 30 includes the protected negative electrode 20 containing a positively charged particle (not illustrated), a side reaction between the protected negative electrode 20 and the electrolyte 24 may be suppressed, and deposition/stripping reactions of the lithium metal negative electrode 11 may be more likely to be reversible. Thus, lithium dendritic growth at an interface between the protected negative electrode 20 and the electrolyte 24 may be suppressed, and a deposition density of the lithium deposition layer formed on the lithium metal negative electrode 11 may increase. Accordingly, volumetric change of the lithium metal battery 30 may be suppressed. Consequently, lifespan characteristics of the lithium metal battery 30 may improve.

The electrolyte 24 of the lithium metal battery 30 may include the composite electrolyte described above. Since the electrolyte 24 includes the composite electrolyte, migration of lithium ions between the positive electrode 21 and the protected negative electrode 20 may be facilitated. Thus, an internal resistance of the lithium metal battery 30 may decrease to thereby further improve charge and discharge characteristics of the lithium metal battery 30. The composite electrolyte may be a liquid electrolyte, a solid electrolyte, or a gel electrolyte.

The electrolyte of the lithium metal battery 30 may include a liquid electrolyte, a solid electrolyte, a gel electrolyte, a polymeric ionic liquid, or a combination thereof. The lithium metal battery 30 may include a separator.

Figure 5B:
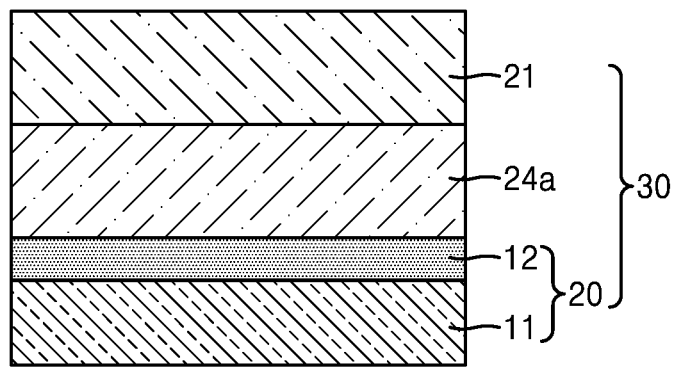
Figure 5C:
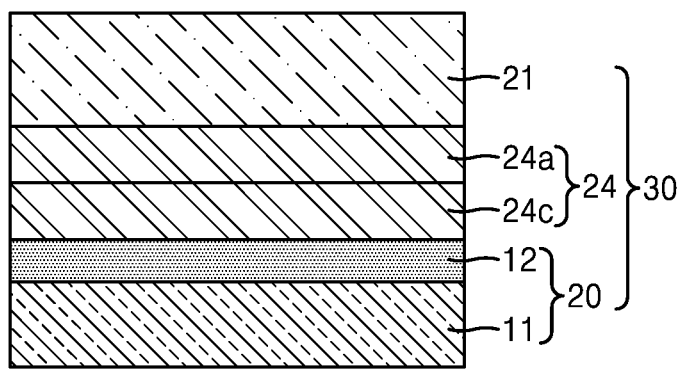
Figure 5D:
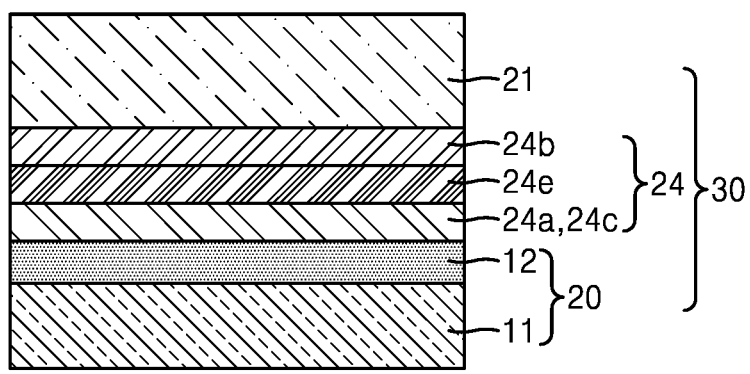

Referring to FIGS. 5B to 5D, depending on a desired energy density, current capacity, lifespan, or the like, of the lithium metal battery 30, the electrolyte 24 may have a monolayer structure and/or a multi-layered structure.

Referring to FIG. 5B, the electrolyte 24 has a monolayer structure including a first liquid electrolyte layer 24a in contact with the protective film 12 of the protected negative electrode 20. A first liquid electrolyte included in the first liquid electrolyte layer 24a may have a composition identical to or different from a composition of the liquid electrolyte included in the protective film 12.

Referring to FIG. 5C, the electrolyte 24 has a monolayer structure including a separator 24c in contact with the protective film 12 of the protected negative electrode 20 and the first liquid electrolyte layer 24a. The separator 24c may be a multi-layer separator including polyethylene, polypropylene, polyvinylidene fluoride, or a combination thereof. For example, the separator 24c may be a two-layer separator including polyethylene/polypropylene, a three-layer separator including polyethylene/polypropylene/polyethylene, or a three-layer separator including polypropylene/polyethylene/polypropylene. However, embodiments are not limited thereto. Any suitable separator used in the prevention of a short circuit between a positive electrode and a negative electrode may be used as the separator 24c.

Referring to FIG. 5D, the electrolyte 24 may have a multi-layer structure including the separator 24c in contact with the protective film 12 of the protected negative electrode 20, and the first liquid electrolyte layer 24a containing a first liquid electrolyte added to and impregnated in the separator 24c; a second solid electrolyte layer 24e in contact with the first liquid electrolyte layer 24a/separator 24c and including a ceramic conductor; and a second liquid electrolyte layer 24b in contact with the second solid electrolyte layer 24e and including a second liquid electrolyte. The positive electrode 21 may be completely separated from the protected negative electrode 20 by the second solid electrolyte layer 24e, and the protected negative electrode 20 may also be completely separated from the second solid electrolyte layer 24e by the first liquid electrolyte layer 24a, thereby suppressing a side reaction. Thus, when the lithium metal battery 30 includes an electrolyte having such a multi-layer structure, the lithium metal battery 30 may have significantly improved lifespan characteristics. In some embodiments, the first liquid electrolyte may be an anolyte, and the second liquid electrolyte may be a catholyte. A composition of the first liquid electrolyte may be identical to or different from that of the second liquid electrolyte.

Figure 5E:
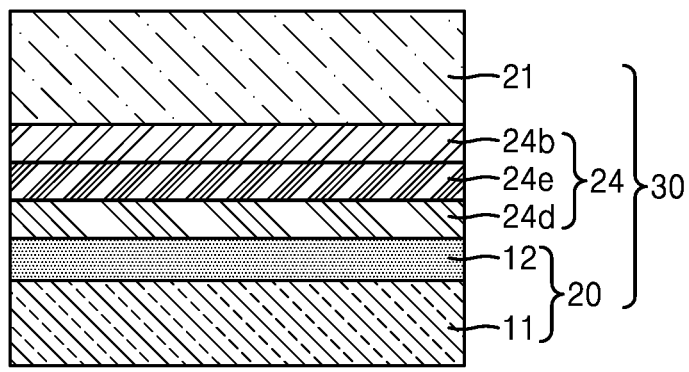

Referring to FIG. 5E, the electrolyte 24 may have a multi-layer structure including a first solid electrolyte layer 24d in contact with the protective film 12 of the protected negative electrode 20, and including a composite electrolyte; the second solid electrolyte layer 24e in contact with the first solid electrolyte layer 24d and including a ceramic conductor; and the second liquid electrolyte layer 24b in contact with the second solid electrolyte layer 24e. The protective film 12 may include a liquid electrolyte.

Figure 5F:
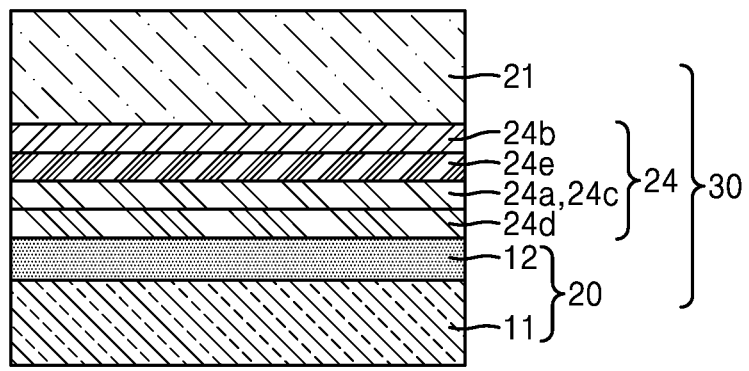

Referring to FIG. 5F, the electrolyte 24 may have a multi-layer structure including a first solid electrolyte layer 24d in contact with the protective film 12 of the protected negative electrode 20 and including a composite electrolyte; the separator 24c in contact with the first solid electrolyte layer 24d; the first liquid electrolyte layer 24a containing a first liquid electrolyte impregnated in the separator 24c; the second solid electrolyte layer 24e in contact with the first liquid electrolyte layer 24a and including a ceramic conductor; and the second liquid electrolyte layer 24b in contact with the second solid electrolyte layer 24e.

Figure 5G:
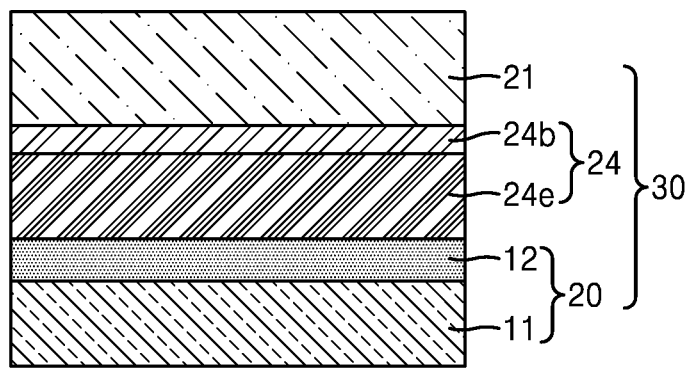

Referring to FIG. 5G, the electrolyte 24 may have a multi-layer structure including the second solid electrolyte layer 24e in contact with the protective film 12 of the protected negative electrode 20 and including a ceramic conductor; and the second liquid electrolyte layer 24b in contact with the second solid electrolyte layer 24e.

Upon charging and discharging of the lithium metal battery, a change in thickness of a protected negative electrode after charging and discharging may be less than a change in thickness of a protected negative electrode including a protected film including a particle that is not positively charged.

Upon charging and discharging of the lithium metal battery, when the protected negative electrode includes the positively charged particle, it may be possible to suppress a side reaction at an interface between a protected negative electrode and an electrolyte and to increase the reversibility of deposition/stripping reactions which may occur, and thereby suppress a change in thickness of the protected negative electrode. In contrast, a lithium metal battery in which a protected negative electrode includes a protective film including a particle that is not positively charged, during charging and discharging, a side reaction between anions and lithium at an interface between a protected negative electrode and an electrolyte may increase, and the reversibility of deposition/stripping reactions may be deteriorated to thereby increase a change in the thickness of the protected negative electrode. Consequently, a lithium metal battery including a protected negative electrode including a protective film including a particle that is not positively charged may have deteriorated cycle characteristics.

A lithium metal battery including the protected negative electrode may be manufactured as follows.

First, a negative electrode including lithium metal and a protected negative electrode including a protective film may be prepared.

A lithium metal thin film may be used as the negative electrode including lithium metal. In some embodiments, a negative electrode including lithium metal may include a current collector and a negative active material layer on the current collector. For example, the negative electrode including lithium metal may be used in a state in which a lithium metal thin film is on a conductive substrate, i.e., a current collector. The lithium metal thin film and the current collector may be formed as a single body.

The current collector in the negative electrode including lithium metal may include stainless steel, copper, nickel, iron, cobalt, or a combination thereof, but the current collector is not limited thereto, and any metallic substrate having excellent electrical conductivity may be used. For example, the current collector may be a conductive oxide substrate or a conductive polymer substrate. Also, the current collector may have a structure such as a surface of an insulating substrate coated with a conductive metal, a conductive metal oxide, a conductive polymer, or a combination thereof, or may be a whole substrate formed of a conductive material. However the structure of the current collector is not limited thereto. For example, the current collector may be a flexible substrate. Thus, the current collector may be easily bent. Also, once it is bent, the current collector may be easily restored to its original shape.

In addition, the negative electrode including lithium metal may include an additional negative active material other than a lithium metal. The negative electrode may be an alloy of lithium metal with another negative active material, a composite of lithium metal with another negative active material, or a mixture of lithium metal with another negative active material.

The additional negative active material that may be added to the negative electrode may include, for example, a metal alloyable with lithium, a transition metal oxide, a non-transition metal oxide, a carbononaceous material, or a combination thereof.

Examples of the metal alloyable with lithium include silicon (Si), tin (Sn), aluminum (Al), germanium (Ge), lead (Pb), bismuth (Bi), antimony (Sb), a Si—Y alloy (wherein Y is an alkali metal, an alkaline earth metal, a Group 13 element, a Group 14 element, a Group 15 element, a Group 16 element, a transition metal, a rare earth element, or a combination thereof, and Y is not Si), and a Sn—Y alloy (wherein Y is an alkali metal, an alkaline earth-metal, a Group 13 element, a Group 14 element, a Group 15 element, a Group 16 element, a transition metal, a rare earth element, or a combination thereof, and Y is not Sn), or a combination thereof. Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

For example, the transition metal oxide may be a lithium titanium oxide, a vanadium oxide, or a lithium vanadium oxide.

For example, the non-transition metal oxide may be $SnO_2$ or $SiO_x$ (wherein 0<x<2).

Examples of the carbonaceous material may include crystalline carbon, amorphous carbon, or a combination thereof. Examples of the crystalline carbon may include graphite, such as natural graphite or artificial graphite that are in shapeless, plate, flake, spherical, or fibrous form. Examples of the amorphous carbon may include soft carbon (carbon sintered at low temperatures), hard carbon, meso-phase pitch carbides, and sintered cokes. A combination comprising at least one of the foregoing may also be used.

A protective film may be on the negative electrode including lithium metal.

The protective film may be prepared using a composite electrolyte including a particle, the particle including a positively charged particle, a particle having a coordinate bond with a cation, or a combination thereof, and a lithium salt.

In some embodiments, after a composite electrolyte is prepared, the composite electrolyte may be directly coated on a negative electrode including lithium metal to prepare a protected negative electrode. In some embodiments, the composite electrolyte may be cast on a separate support to form a film, which may then be separated from the support and laminated on the negative electrode including lithium metal to obtain a protected negative electrode. The form of the protected negative electrode is not limited to the foregoing description, and the protected negative electrode may be in any suitable form for a lithium battery. For example, the protected negative electrode may be prepared by printing a composition ink including a composite electrolyte on a negative electrode including lithium metal by inkjet printing or the like.

The composite electrolyte may be prepared by mixing the particle and the lithium salt in an organic solvent. The organic solvent used in the composite electrolyte is not particularly limited, and may include, dimethyl aceteamide, dimethyl sulfoxide, or the like, or a combination thereof.

Next, a positive electrode is prepared.

A positive active material, a conductive agent, a binder, and a solvent are combined to prepare a positive active material composition. The positive active material composition may be directly coated on an aluminum current collector and dried to prepare a positive electrode plate having a formed positive active material layer. Alternatively, the positive active material composition may be cast on a separate support, which then may be separated from the support and laminated on an aluminum current collector to prepare a positive electrode plate having a positive active material layer thereon.

The positive active material is not limited and may be any suitable positive active material in the art, and for example, may be a lithium-containing metal oxide. In one or more embodiments, the positive active material may include a composite oxide of lithium and a metal including cobalt, manganese, nickel, or a combination thereof. In one or more embodiments, the positive active material may be a compound represented by the following formulae: $Li_aA_{1-b}B'_bD_2$ (wherein $0.90 \leq a \leq 1.8$ and $0 \leq b \leq 0.5$); $Li_aE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$ and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); $LiFePO_4$, or a combination thereof.

In the foregoing formulae, A may include nickel (Ni), cobalt (Co), manganese (Mn), or a combination thereof; B' may include aluminum (Al), Ni, Co, Mn, chromium (Cr), iron (Fe), magnesium (Mg), strontium (Sr), vanadium (V), a rare-earth element, or a combination thereof; D may include oxygen (O), fluorine (F), sulfur (S), phosphorus (P), or a combination thereof; E may include Co, Mn, or a combination thereof; F' may include F, S, P, or a combination thereof; G may include Al, Cr, Mn, Fe, Mg, lanthanum (La), cerium (Ce), Sr, V, or a combination thereof; Q may include titanium (Ti), molybdenum (Mo), Mn, or a combination thereof; I' may include Cr, V, Fe, scandium (Sc), yttrium (Y), or a combination thereof; and J may include V, Cr, Mn, Co, Ni, copper (Cu), or a combination thereof.

For example, the positive active material may be $Li_aNi_bCo_cMn_dO_2$ (wherein $0.90 \leq a \leq 1.8$, $0 \leq b \leq 0.9$, $0 \leq c \leq 0.5$, and $0 \leq d \leq 0.5$), $Li_2MnO_3$, $LiMO_2$ (wherein M may be Mn, Fe, Co, or Ni), $Li_aNi_bCo_cAl_dO_2$ (wherein $0.90 \leq a \leq 1.8$, $0 \leq b \leq 0.9$, $0 \leq c \leq 0.5$, and $0 \leq d \leq 0.5$), $LiCoO_2$, $LiMn_xO_{2x}$ (wherein x=1 or 2), $LiNi_{1-x}Mn_xO_{2x}$ (wherein $0 < x < 1$), or $LiFePO_4$, or a combination thereof.

The compounds listed above as positive active materials may have a coating layer on a surface thereof. Alternatively, a mixture of a compound without a coating layer and a compound having a coating layer, may be used. The above-mentioned compounds may be used. In one or more embodiments, the coating layer may include a coating element including an oxide, a hydroxide, an oxyhydroxide, an oxycarbonate, or a hydroxycarbonate of the coating element, or a combination thereof. In one or more embodiments, the compound for the coating layer may be amorphous or crystalline. In one or more embodiments, the coating element for the coating layer may include magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In one or more embodiments, the coating layer may be formed using any suitable method that does not adversely affect the physical properties of the positive active material when the coating layer is present. For example, the coating layer may be formed using a spray coating method or a dipping method. The coating method is not limited and may be any method in the art, and thus a detailed description thereof will be omitted.

The conductive agent may include acetylene black, Ketjen black, natural graphite, artificial graphite, carbon black, acetylene black, carbon fiber, and metal powder and metal fiber of, e.g., copper, nickel, aluminum, silver, or a combination thereof. In some embodiments, a conductive material such as a polyphenylene derivative may be used alone or in combination with an additional conductive agent, but embodiments are not limited thereto. Any suitable conductive agent available in the art may be used.

Examples of the binder may include a vinylidene fluoride/hexafluoropropylene copolymer, polyvinylidene fluoride (PVDF), polyacrylonitrile, polymethylmethacrylate, polytetrafluoroethylene, a styrene-butadiene rubber polymer, or a combination thereof, but embodiments are not limited thereto. Any suitable material available as a binder may be used.

Examples of the solvent include N-methyl-pyrrolidone, acetone, water, or a combination thereof, but embodiments are not limited thereto. Any suitable solvent in the art may be used.

The amounts of the positive active material, the conductive agent, the binder, and the solvent may be determined by the person of skill in the art without undue experimentation. At least one of the conductive agent, the binder, and the solvent may be omitted according to the use and the structure of the lithium battery.

Next, a separator to be disposed between the positive electrode and the negative electrode is prepared.

The separator may be any suitable separator for use in a lithium battery. The separator may have low resistance to the migration of ions in an electrolyte and may have electrolytic solution-retaining ability. Examples of the separator may include glass fiber, polyester, polyethylene, polypropylene, polytetrafluoroethylene (PTFE)(e.g., Teflon™), or a combination thereof, each of which may be a non-woven or woven fabric. For example, a rollable separator such as polyethylene, polypropylene, or the like may be used in a lithium ion battery. For example, a separator with excellent ability to retain an organic electrolyte solution, may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on the electrode to form the separator.

The polymer resin used to manufacture the separator may be any suitable material that is used as a binder for electrode plates. Examples of the polymer resin may include a vinylidene fluoride/hexafluoropropylene copolymer, polyvinylidene fluoride (PVDF), polyacrylonitrile, polymethylmethacrylate, or a combination thereof.

Next, a liquid electrolyte is prepared.

For example, an organic electrolyte solution may be prepared. The organic electrolyte solution may be prepared by dissolving a lithium salt in an organic solvent.

The organic solvent is not limited, and any suitable organic solvent for a lithium battery may be used. For example, the organic solvent may be propylene carbonate, ethylene carbonate, fluoroethylene carbonate, vinylethylene carbonate, diethyl carbonate, methyl ethyl carbonate, methyl propyl carbonate, butylene carbonate, benzonitrile, acetonitrile, tetrahydrofuran, 2-methyl tetrahydrofuran, γ-butyrolactone, dioxolane, 4-methyl dioxolane, N,N-dimethyl formamide, dimethyl aceteamide, dimethyl sulfoxide, dioxane, 1,2-dimethoxy ethane, sulfolane, dichloroethane, chlorobenzene, nitrobenzene, dimethyl carbonate, methyl isopropyl carbonate, succinonitrile, diethyl glycol dimethyl ether, tetraethylene glycol dimethyl ether, triethyl glycol dimethyl ether, polyethyl glycol dimethyl ether, ethyl propyl carbonate, dipropyl carbonate, dibutyl carbonate, diethylene glycol, dimethyl ether, or a combination thereof.

The lithium salt is not limited and may be any material suitable for a lithium battery. For example, the lithium salt may include $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y may each be a natural number), LiCl, LiI, or a combination thereof.

Figure 6:
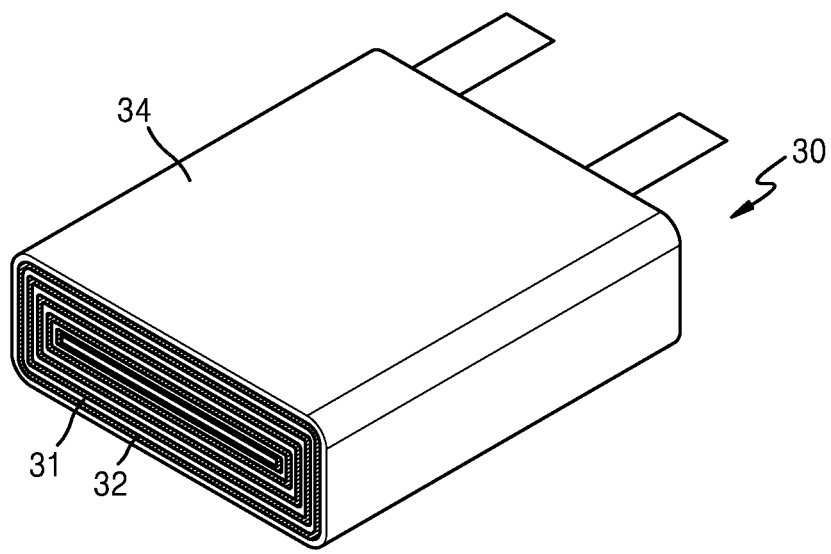
FIG. 6 is a schematic view illustrating an embodiment of a lithium battery.

Referring to FIG. 6, the lithium metal battery 30 includes a positive electrode 31, a negative electrode 32, and a battery case 34 including the positive electrode 31 and the negative electrode 32. The positive electrode 31, the negative electrode 32, and a separator (not shown) may be wound or folded, and then sealed in the battery case 34. An organic electrolyte solution may be injected into the battery case 34, and then the battery case 34 may be sealed to thereby complete the manufacture of the lithium metal battery 30. The battery case 34 may be a cylindrical type, a rectangular type, or a thin-film type. In FIG. 6, the battery case 34 is illustrated as a rectangular type, however, the battery case may also be a flexible pouch type. Thus, the battery case 34 may be bent or elongated.

The positive electrode 31 may be a porous positive electrode. The porous positive electrode may be include a plurality of pores, or may be any positive electrode that allows permeation of a liquid electrolyte thereinto by capillary action, or the like.

For example the porous positive electrode may include a positive electrode prepared by coating and drying a positive active material composition including a positive active material, a conductive agent, a binder, and a solvent. The thus prepared positive electrode may include a plurality of pores between the positive active material particles. The porous positive electrode may be impregnated with a liquid electrolyte.

In some embodiments, a positive electrode may include a liquid electrolyte, a gel electrolyte, a solid electrolyte, or a combination thereof. The liquid electrolyte, the gel electrolyte, and the solid electrolyte may be any suitable electrolyte for use in a lithium metal battery that does not react with the positive active material, and thus prevents deterioration of the positive active material during a charge/discharge process.

In one or more embodiments, a plurality of lithium metal batteries may be stacked to form a battery pack, which may be used in a device having large capacity and high power usage, for example, in a laptop computer, a smartphone, or an electric vehicle (EV).

The lithium metal battery is not particularly limited to a lithium ion battery or a lithium polymer battery; the lithium metal battery may also include a lithium air battery, a lithium all-solid battery, or the like.

As used herein, substituted means that the compound or group is substituted with at least one (e.g., 1, 2, 3, or 4) substituent. The substituent may be added by the replacement of at least one hydrogen atom in a compound or group with another atom or a functional group. The substituent may include a $C_1$-$C_{40}$ alkyl group, a $C_2$-$C_{40}$ alkenyl group, a $C_2$-$C_{40}$ alkynyl group, a $C_3$-$C_{40}$ cycloalkyl group, a $C_3$-$C_{40}$ cycloalkenyl group, and a $C_7$-$C_{40}$ aryl group. When a functional group is "optionally" substituted, it means that the functional group may be substituted with such a substituent as listed above.

a and b in the term "$C_a$-$C_b$" as used herein refer to the number of carbons in a particular functional group. That is, a functional group may include from a to b carbon atoms. For example, "$C_1$-$C_4$ alkyl group" refers to an alkyl group having 1 to 4 carbon atoms, such as $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, or $(CH_3)_3C$—.

As used herein, a particular radical may refer to a mono-radical or a di-radical depending on the context. For example, when a substituent needs two binding sites to bind with the rest of the molecule, the substituent may be understood as a di-radical. For example, a substituent specified as an alkyl group that needs two binding sites may be a di-radical, such as —$CH_2$—, —$CH_2CH_2$—, or —$CH_2CH(CH_3)CH_2$—. The term "alkylene" clearly indicates that the radical is a di-radical.

The term "alkyl" as used herein refers to a branched or unbranched saturated, monovalent hydrocarbon group. In some embodiments, an alkyl group may be substituted or unsubstituted. Non-limiting examples of the alkyl group may include a methyl group, an ethyl group, a propyl group, an iso-propyl group, a butyl group, an isobutyl group, a tert-butyl group, a pentyl group, a hexyl group, a cyclopropyl group, a cyclopentyl group, a cyclohexyl group, and a cycloheptyl group, each of which may optionally be substituted or unsubstituted. In some embodiments, an alkyl group may have 1 to 6 carbon atoms. Non-limiting examples of a $C_1$-$C_6$ alkyl group include a methyl group, an ethyl group, a propyl group, an isopropyl group, a butyl group, an isobutyl group, a sec-butyl group, a pentyl group, a 3-pentyl group, and a hexyl group.

The term "alkenyl" or "alkylene" as used herein refers to a straight or branched chain, monovalent hydrocarbon group including 2 to 20 carbon atoms, having at least one carbon-carbon double bond. Non-limiting examples thereof include an ethenyl group, a 1-prophenyl group, a 2-prophenyl group, a 2-methyl-1-prophenyl group, a 1-butenyl group, a 2-butenyl group, a cycloprophenyl group, a cyclopentenyl group, a cyclohexenyl group, and a cycloheptenyl group. For example, an alkenyl group may be substituted or unsubstituted. In some embodiments, an alkenyl group may have 2 to 40 carbon atoms.

The term "alkynyl" as used herein refers to a straight or branched chain, monovalent hydrocarbon group including 2 to 20 carbon atoms, having at least one carbon-carbon triple bond. Non-limiting examples thereof include an ethynyl group, a 1-propynyl group, a 1-butynyl group, and a 2-butynyl group. For example, an alkynyl group may be substituted or unsubstituted. In some embodiments, an alkynyl group may have 2 to 40 carbon atoms.

The term "cycloalkyl" refers to a monovalent group having one or more saturated rings in which all ring members are carbon. For example, the "cycloalkyl" may be a cyclopropyl group, a cyclobutyl group, a cyclopentyl group, or a cyclohexyl group.

The term "aromatic" refers to a ring or ring system with a conjugated π electron system, and may refer to a carbocyclic aromatic group (e.g., a phenyl group), or a heterocyclic aromatic group (e.g., a pyridine group). For example, an aromatic ring system as a whole may include a single ring or a fused polycyclic ring (i.e., a ring that shares adjacent atom pairs).

The term "aryl" as used herein refers to a cyclic moiety in which all ring members are carbon and at least one ring is aromatic, the moiety having the specified number of carbon atoms, specifically 6 to 24 carbon atoms, more specifically 6 to 12 carbon atoms. More than one ring may be present, and any additional rings may be independently aromatic, saturated or partially unsaturated, and may be fused, pendant, spirocyclic or a combination thereof. Non-limiting examples of the aryl group include a phenyl group, a biphenyl group, a naphthyl group, a phenanthrenyl group, and a naphthacenyl group. In some embodiments, an aryl group may be substituted or unsubstituted.

The term "arylene" as used herein refers to a divalent group formed by the removal of two hydrogen atoms from one or more rings of an arene, wherein the hydrogen atoms may be removed from the same or different rings Examples of the arylene include —C$_6$H$_5$—O—C$_6$H$_5$—.

The term "heteroaryl" as used herein refers a monovalent carbocyclic ring group that includes one or more aromatic rings, in which at least one ring member (e.g., one, two or three ring members) is a heteroatom. For example, the heteroatom may be oxygen, sulfur, or nitrogen, but embodiments are not limited thereto. Non-limiting examples of the heteroaryl group include a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, and an indolyl group.

The term "heteroarylene" as used herein refers to a divalent radical formed by the removal of two hydrogen atoms from one or more rings of a heteroaryl moiety, wherein the hydrogen atoms may be removed from the same or different rings (preferably the same ring), each of which rings may be aromatic or nonaromatic The terms "aralkyl" or "alkylaryl" as used herein refers to an alkyl group covalently linked to a substituted or unsubstituted aryl group that is linked to a compound. Non-limiting examples of the aralkyl or alkylaryl include a benzyl group, a 2-phenylethyl group, a 3-phenylpropyl group, and a naphthylalkyl group.

The term "cycloalkenyl" as used herein refers to a monovalent non-aromatic group having one or more rings and one or more carbon-carbon double bond in the ring, wherein all ring members are carbon (e.g., cyclopentyl and cyclohexyl).

The terms "heterocyclic group" as used herein refers to a non-aromatic ring or ring system including at least one heteroatom in its cyclic backbone.

The term "halogen" as used herein refers to a stable atom belonging to Group 17 of the periodic table of elements, for example, fluorine, chlorine, bromine, iodine, or astatine. For example, the halogen atom may be fluorine and/or chlorine.

A weight average molecular weight of the polymer may be measured by gel permeation chromatography (GPC) using a polystyrene standard.

Hereinafter example embodiments will be described in detail with reference to Examples and Comparative Examples. These examples are provided for illustrative purposes only and are not intended to limit the scope of the inventive concept.

EXAMPLES (Preparation of Composite Electrolyte)

Example 1: PEO+MS-DEAE+Lithium Salt

Polyethylene oxide (PEO) was mixed with acetonitrile to obtain a solution of 5 weight percent (wt %) PEO in acetonitrile. To the PEO acetonitrile solution, a particle-containing mixture and lithium bis(fluorosulfonyl) imide (LiFSI, LiN(SO$_2$F)$_2$) were added to prepare a composite electrolyte-forming composition.

Anhydrous THF was added to a MS-DEAE microsphere (having an average diameter of about 3 μm), in which a poly(styrene-divinylbenzene) copolymer particle is linked to the diethylamino ethylenyl group represented by Formula 8 via a covalent bond, to thereby obtain the particle-containing mixture. Here, the amount of the particle was about 5 wt %.

A composite electrolyte-forming composition was prepared in which the amount of the particle was 15 parts by weight, based on 100 parts by weight of the PEO, and the amount of the LiFSI was 30 parts by weight, based on 100 parts by weight of the PEO.

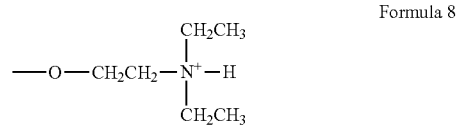

Formula 8

The prepared composite electrolyte-forming composition was cast on a member, and acetonitrile and THF in the resultant was gradually evaporated in an argon glove box for 24 hours at a temperature of about 25° C., and subsequently, under vacuum at a temperature of 25° C., the result was dried for 24 hours to prepare a composite electrolyte film. The thickness of the prepared composite electrolyte film was about 50 μm.

Comparative Example 1: PEO+MS+Lithium Salt

A composite electrolyte in the form of a film was prepared in substantially the same manner as in Example 1, except that a poly(styrene-b-divinylbenzene) block copolymer microsphere (having an average diameter of about 3 μm, EPR-PSD-3, available from EPRUI Nanoparticles & Microspheres Co., Ltd.) was used instead of the MS-DEAE microsphere.

The poly(styrene-b-divinylbenzene) block copolymer including a polystyrene block and a polydivinylbenzene block in a mixed ratio of about 9:1 by weight, had a weight average molecular weight of about 100,000 Daltons.

Comparative Example 2: PEO+SiO₂+Lithium Salt

A composite electrolyte in the form of a film was prepared in substantially the same manner as in Example 1, except that a silica (SiO₂) nanoparticle (having an average diameter of about 7 nm) was used instead of the MS-DEAE microsphere.

Comparative Example 3: PEO+Lithium Salt

A composite electrolyte in the form of a film was prepared in substantially the same manner as in Example 1, except that the MS-DEAE microsphere was not added.
(Manufacture of Protective Film and Protected Negative Electrode)

Example 2: MS-DEAE+Lithium Salt Protective Film/Protected Negative Electrode

Anhydrous THF was added to a MS-DEAE microsphere (having an average diameter of about 3 μm), in which a poly(styrene-divinylbenzene) copolymer particle is covalently linked to the diethylamino oxyethylenyl group represented by Formula, to thereby obtain the particle-containing mixture. Here, the amount of the particle was about 5 wt %.

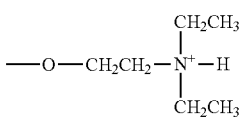

Formula 8

To the prepared particle-containing mixture, lithium bis(fluorosulfonyl) imide (LiFSI, LiN(SO₂F)₂) was added to prepare a protective film-forming composition. The amount of LiFSI was about 30 parts by weight, based on based on 100 parts by weight of the particle.

The prepared protective film-forming composition was coated on a lithium metal thin film (having a thickness of about 40 μm) to a thickness of about 3 μm using a doctor blade.

The coated resultant was dried at a temperature of about 25° C., and subsequently, under vacuum at a temperature of about 40° C., the result was dried for about 24 hours to prepare a protected negative electrode in which a protective film was formed on a lithium metal thin film.

Example 3: MS-DEAE+Lithium Salt+DEGDA Crosslinked Material Protective Film/Protected Negative Electrode Anhydrous THF was added to a MS-DEAE microsphere (having an average diameter of about 3 μm), in which a poly(styrene-divinylbenzene) copolymer particle is covalently linked to the diethylamino oxyethylenyl group represented by Formula 8, to thereby obtain the particle-containing mixture. Here, the amount of the particle was about 5 wt %.

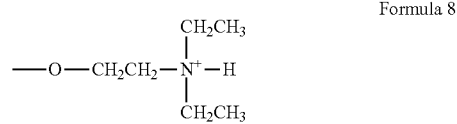

Formula 8

To the prepared particle-containing mixture, lithium bis(fluorosulfonyl) imide (LiFSI, LiN(SO₂F)₂) was added to prepare a protective film-forming composition. The amount of LiFSI was about 30 parts by weight, based on based on 100 parts by weight of the particle.

The prepared protective film-forming composition was coated on a lithium metal thin film (having a thickness of about 40 μm) to a thickness of about 3 μm using a doctor blade.

The coated resultant was dried at a temperature of about 25° C., and subsequently, under vacuum at a temperature of about 40° C., the result was dried for about 24 hours.

Diethylene glycol diacrylate (DEGDA) was dissolved in THF to prepare a 30 wt % solution. In the solution, the amount of DEGDA was about 30 parts by weight, based on 100 parts by weight of the microsphere. This solution was cast on the coated and dried resultant. The cast resultant was dried at a temperature of about 25° C. for 12 hours, and subsequently, the result was irradiated with ultraviolet (UV) light at a temperature of about 40° C. for 1 hour to prepare a protected negative electrode in which a protective film was formed, the protective film including microspheres on a lithium metal thin film and a crosslinked material of DEGDA in gaps (i.e., space) between the microspheres. The amount of DEGDA was about 20 parts by weight, based on 100 parts by weight of the MS-DEAE microsphere.

Comparative Example 4: MS+Lithium Salt Protective Film/Protected Negative Electrode A protective film-type negative electrode having a formed protective film was prepared in substantially the same manner as in Example 2, except that the protective film-forming composition was prepared using a poly(styrene-b-divinylbenzene) block copolymer microsphere (having an average diameter of about 3 μm, EPR-PSD-3, available from EPRUI Nanoparticles & Microspheres Co., Ltd.) instead of the MS-DEAE microsphere.

The block copolymer included a polystyrene block and a polydivinylbenzene block in a mixed ratio of about 9:1 by weight, and the poly(styrene-b-divinylbenzene) copolymer had a weight average molecular weight of about 100,000 Daltons.

Comparative Example 5: Bare Lithium Negative Electrode

Lithium metal thin film (having a thickness of about 40 μm) was used as a negative electrode.
(Manufacture of Lithium Metal Battery)

Example 4

A protected negative electrode, in which a protective film was formed on a lithium metal thin film, was prepared in substantially the same manner as in Example 2. LiNi$_{1/3}$Co$_{1/3}$Mn$_{1/3}$O$_2$, a conductive agent (Super-P™; available from Timcal Ltd.), PVDF, and N-methyl pyrrolidone were mixed together to prepare a positive active material layer-forming composition. In the positive active material layer-forming composition, a mixed ratio of LiNi$_{1/3}$Co$_{1/3}$Mn$_{1/3}$O$_2$ to the conductive agent to PVDF was 97:1.5:1.5 by weight. About 137 grams (g) of N-methyl pyrrolidone was used for 97 g of LiNi$_{1/3}$Co$_{1/3}$Mn$_{1/3}$O$_2$.

The positive active material layer-forming composition was coated on an aluminum foil (having a thickness of about 15 μm) and then dried at 25° C., followed by drying the result at about 110° C. under vacuum to thereby prepare a positive electrode.

A polyethylene separator (having a porosity of about 48%) was disposed between the prepared positive electrode and a protected negative electrode (having a thickness of about 43 μm) to manufacture a lithium metal battery in a pouch cell form.

A liquid electrolyte was injected into the gap between the positive electrode and the protected negative electrode. The liquid electrolyte was an electrolyte in which 1.0 molar (M) LiN(SO$_2$F)$_2$ (hereinafter, referred to as "LiFSI") was dissolved in a mixed solvent of 1,2-dimethoxyethane (DME) to 1,1,2,2-tetrafluoroethyl 2,2,3,3-tetrafluoropropyl ether (TTE) in a ratio of 2:8 by volume.

Example 5

A lithium metal battery was manufactured in substantially the same manner as in Example 4, except that the protected negative electrode prepared in Example 3 was used instead of the protected negative electrode prepared in Example 2.

Comparative Example 6

A lithium metal battery was manufactured in substantially the same manner as in Example 4, except that the protected negative electrode prepared in Comparative Example 4 was used instead of the protected negative electrode prepared in Example 2.

Comparative Example 7

A lithium metal battery was manufactured in substantially the same manner as in Example 4, except that the lithium metal negative electrode prepared in Comparative Example 5 was used instead of the protected negative electrode prepared in Example 2.

Evaluation Example 1: Measurement of Lithium Ion Transference Number (T$_{Li+}$) of Composite Electrolyte For each of the composite electrolyte films prepared in Example 1 and Comparative Examples 1 to 3, a lithium ion transference number was measured at a temperature of 60° C. by using a lithium symmetric cell and an impedance analyzer (Solartron 1260A Impedance/Gain-Phase Analyzer coupled with Solartron 1287 Electrochemical Interface). A lithium ion transference number was derived using an alternating current (AC) impedance method combined with a steady-state current method. First, an initial lithium interface resistance (Ro) was measured from an impedance spectrum in a frequency range of 0.1 hertz (Hz) to 100 kilohertz (kHz), and subsequently, a small direct current voltage (less than 30 millivolts (mV)) was applied thereto until a steady-state current (Iss) was obtained (time=3,000 seconds). Finally, a steady-state lithium interfacial resistance (Rss) was measured from the impedance spectrum in a frequency range of 0.1 Hz to 100 kHz. A lithium ion transference number was derived using the parameters obtained from the impedance response and the steady-state current response. In the lithium symmetric cell, as a composite electrolyte film was disposed between lithium electrodes, the lithium symmetric cell had a Li/composite electrolyte/Li structure, followed by sealing in a coin-cell.

The measurement results are shown in Table 1.

TABLE 1

| | Lithium ion transference number (T$_{Li+}$) |
|---|---|
| Comparative Example 3 | 0.13~0.15 |
| Comparative Example 2 | 0.12~0.16 |
| Comparative Example 1 | 0.13~0.16 |
| Example 1 | 0.18~0.22 |

As shown in Table 1, the composite electrolyte of Example 1 was found to have an improved lithium ion transference number, as compared with the composite electrolytes of Comparative Examples 1 to 3.

Accordingly, a lithium battery including the composite electrolyte of Example 1 has a decreased interfacial resistance and/or interface resistance, thereby improving cycle characteristics of the lithium battery.

In particular, the composite electrolyte of Example 1 including the positively charged particle had an improved lithium ion transference number, as compared with the composite electrolyte of Comparative Example 1 including the particle that does not have a positive charge (not positively charged).

Without being limited by theory, it is believed that the increase in the lithium ion transference number in the composite electrolyte of Example 1 may have resulted from suppression and/or prevention of charge transfer of anions of a lithium salt due to electrostatic attraction of the anions to the positively charged particle serving as a receptor of anions, and which relatively facilitated migration of lithium ions. In contrast, in the composite electrolyte of Comparative Example 1 including the particle that is not positively charged, it is difficult to suppress and/or prevent migration of such anions.

Evaluation Example 2: Measurement of Lithium Ion Transference Number (T$_{Li+}$) of Protective Film For each of the protected negative electrode prepared in Example 2 and the lithium negative electrode prepared in Comparative Example 5, a lithium ion transference number was measured at a temperature of 25° C. in substantially the same manner as in Evaluation Example 1 by using a lithium symmetric cell and an impedance analyzer (Solartron 1260A Impedance/Gain-Phase Analyzer coupled with Solartron 1287 Electrochemical Interface).

A polyethylene separator (having a porosity of about 48%) impregnated with a liquid electrolyte was disposed between protective films of a pair of protected negative electrodes prepared in Example 2, followed by sealing. Accordingly, a lithium symmetric cell having a Li/protective film/liquid electrolyte/protective film/Li structure was prepared.

As the protective film of the protected negative electrode of Example 2 was impregnated with a liquid electrolyte, the protective film includes the liquid electrolyte.

A polyethylene separator (having a porosity of about 48%) impregnated with a liquid electrolyte was disposed between a pair of the bare lithium negative electrodes of Comparative Example 5, followed by sealing. Accordingly, a lithium symmetric cell having a Li/liquid electrolyte/Li structure was prepared.

The liquid electrolyte was an electrolyte in which 1.0 M LiFSI was dissolved in a mixed solvent of 1,2-dimethoxyethane (DME) to 1,1,2,2-tetrafluoroethyl 2,2,3,3-tetrafluoropropyl ether (TTE) in a ratio of 2:8 by volume.

The measurement results are shown in Table 2.

TABLE 2

| | Lithium ion transference number ($T_{Li+}$) |
|---|---|
| Example 2 | 0.62~0.68 |
| Comparative Example 5 | 0.50~0.54 |

As shown in Table 2, although a protective film was additionally disposed on lithium metal in the protected negative electrode of Example 2, the protected negative electrode of Example 2 was found to have an increased lithium ion transference number, as compared with the lithium negative electrode of Comparative Example 5.

Accordingly, a lithium battery including the protected negative electrode including the protective film of Example 2 has a decreased interfacial resistance and/or interface resistance, thereby improving cycle characteristics of the lithium battery.

Without being limited by theory, it is believed that the increase in a lithium ion transference number in the protective film of Example 2 may be because the charge transfer of anions was suppressed and/or prevented due to electrostatic attraction of the anions to the positively charged particle by the positively charged particle serving as a receptor of anions, which relatively facilitated migration of lithium ions. In contrast, in the lithium negative electrode of Comparative Example 5, it may be difficult to suppress and/or prevent such charge transfer of anions.

Evaluation Example 3: Measurement of Tensile Modulus of Protective Film

The protective film-forming composition prepared in Example 2 was cast on a member, and THF in the resultant was gradually evaporated in an argon glove box for 24 hours at a temperature of about 25° C., and subsequently, under vacuum at a temperature of 25° C., the result was dried for 24 hours to prepare a protective film in the form of a film. The thickness of the protective film was about 50 μm.

The tensile modulus of the prepared protective film was measured using DMA (DMA800, available from TA Instruments Inc.). The protective film samples for the tensile modulus measurement were prepared according to the ASTM standard D412 (Type V specimens). The tensile modulus is also known as Young's modulus.

Variations in strain with respect to stress (stress/strain) in the protective film may be measured at a temperature of about 25° C., a relative humidity of about 30%, and a rate of 5 millimeters per minute (mm/min). The tensile modulus was calculated from the slope of a stress-strain curve thereof.

As the result of tensile modulus measurement, the protective film of Example 2 was found to have a tensile modulus of $10^6$ Pa or greater.

Accordingly, when the protective film of Example 2 is used, the volumetric change of the lithium metal negative electrode and lithium dendritic growth may be suppressed.

Evaluation Example 4: Evaluation of Thickness Change of Pouch Cell

Each of the lithium metal batteries manufactured in Examples 4 and 5 and Comparative Examples 6 and 7 was charged with a constant current of 0.1 C rate until a voltage of about 4.20 V (vs. Li), and maintained at a constant voltage of 4.20 V (constant voltage mode) until a cutoff current of 0.05 C rate. Subsequently, the batteries were discharged with a constant current of 0.1 C rate until the voltage reached 3.0 V (vs. Li) (Formation process, $1^{st}$ cycle).

Subsequently, each of the lithium metal batteries was charged with a constant current of 0.2 C rate until a voltage of about 4.20 V (vs. Li), and maintained at a constant voltage of 4.20 V (constant voltage mode) until a cutoff current of 0.05 C rate. Subsequently, the batteries were discharged with a constant current of 0.2 C rate until the voltage reached 3.0 V (vs. Li) (Formation process, $2^{st}$ cycle).

The batteries that went through the formation process were charged with a constant current of 0.5 C rate at room temperature (25° C.) until the voltage reached 4.2 V (vs. lithium metal). Subsequently, the batteries were discharged with a constant current of 0.5 C rate until the voltage reached a cut-off voltage of 3.0 V.

This charge/discharge process was performed repeatedly for 50 times from the $1^{st}$ cycle to the $50^{th}$ cycle of the charge/discharge process.

As the charging and discharging cycle was performed repeatedly, the change in cell thickness upon charging and discharging was monitored. The partial results thereof are shown in Table 3. The change in thickness upon charging and discharging are indicated as thickness change after charging/thickness change after discharging.

TABLE 3

| | Thickness change upon $1^{st}$ cycle of charging and discharging thickness change after charging/ thickness change after discharging (μm) | Thickness change upon $10^{th}$ cycle of charging and discharging thickness change after charging/ thickness change after discharging (μm) | Thickness change upon $50^{th}$ cycle of charging and discharging thickness change after charging/ thickness change after discharging (μm) |
|---|---|---|---|
| Example 4 | 24/12 | 57/35 | 94/76 |
| Comparative Example 6 | 24/24 | 77/48 | 119/98 |

TABLE 3-continued

| | Thickness change upon $1^{st}$ cycle of charging and discharging thickness change after charging/ thickness change after discharging (μm) | Thickness change upon $10^{th}$ cycle of charging and discharging thickness change after charging/ thickness change after discharging (μm) | Thickness change upon $50^{th}$ cycle of charging and discharging thickness change after charging/ thickness change after discharging (μm) |
|---|---|---|---|
| Comparative Example 7 | 56/26 | 90/60 | 152/121 |

As shown in Table 3, upon a charge/discharge process, the lithium metal battery of Example 4 was found to have less change in thickness than the lithium metal negative electrodes of the lithium metal batteries of Comparative Example 6 and 7.

Without being limited by theory, it is believed that the decrease in thickness change of a lithium metal negative electrode may have resulted from the protective film of the lithium metal battery of Example 4 including a positively charged particle, which may result in suppression and/or prevention of charge transfer of anions in the vicinity of a surface of the lithium metal negative electrode. Thus, a side reaction between the lithium metal negative electrode and anions was prevented, consequently resulting in an increase in the lithium ion transference number. In other words, without being limited by theory, an increase in the concentration of lithium ions and uniform distribution of lithium ions at an interface between the lithium metal negative electrode and the electrolyte increases the reversibility of the lithium deposition/dissolution reaction, thereby suppressing formation of lithium dendrites or increasing density of generated lithium dendrites.

In addition, upon a charge/discharge process, due to increased reversibility of lithium deposition/stripping reactions, the amount of consumed lithium decreased, wherein the consumed lithium is not reduced back to lithium metal upon charging after being oxidized to lithium ions upon discharging, thus resulting in the formation of lithium dendrites, or the like. Accordingly, the lifespan of the lithium metal battery may further improve. For example, upon a charge/discharge process, the lithium metal negative electrode of Comparative Examples 6 and 7 is accompanied by an increased volumetric change in the negative electrode, and this increased volumetric change in the negative electrode means irreversible leakage of excess lithium contributing to the formation of lithium dendrites. Therefore, upon a long-term charging and discharging of the lithium metal batteries of Comparative Examples 6 and 7, a thickness of lithium metal may drastically decrease and be depleted, thereby shortening lifespan of the lithium metal batteries. In contrast, as the volumetric change of the lithium metal battery of Example 5 is suppressed, lifespan of the lithium metal battery may increase.

Evaluation Example 5: Evaluation of Pouch Cell Charging and Discharging Characteristics Each of the lithium metal batteries manufactured in Examples 4 and 5 and Comparative Examples 6 and 7 was charged with a constant current of 0.1 C rate until a voltage of about 4.20 V (vs. Li), and maintained at a constant voltage of 4.20 V (constant voltage mode) until a cutoff current of 0.05 C rate. Subsequently, the batteries were discharged with a constant current of 0.1 C rate until the voltage reached 3.0 V (vs. Li) (Formation process, $1^{st}$ cycle).

Subsequently, each of the lithium metal batteries was charged with a constant current of 0.2 C rate until a voltage of about 4.20 V (vs. Li), and maintained at a constant voltage of 4.20 V (constant voltage mode) until a cutoff current of 0.05 C rate. Subsequently, the batteries were discharged with a constant current of 0.2 C rate until the voltage reached 3.0 V (vs. Li) (Formation process, $2^{st}$ cycle).

The batteries that went through the formation process were charged with a constant current of 0.5 C rate at room temperature (25° C.) until the voltage reached 4.2 V (vs. lithium metal). Subsequently, the batteries were discharged with a constant current of 0.5 C rate until the voltage reached a cut-off voltage of 3.0 V.

This charge/discharge process was performed repeatedly and this charge/discharge process was stopped at the cycle when the capacity retention reduced to 80%.

In other words, the number of cycles at which the battery had a capacity retention of 80% or higher was measured to evaluate lifespan characteristics.

The capacity retention at an $n^{th}$ cycle was calculated by Equation 1. The partial measurement results are shown in Table 4.

Capacity retention at the $n^{th}$ cycle (%)=(discharge capacity at the $n^{th}$ cycle/discharge capacity at the $1^{st}$ cycle)×100%    Equation 1

TABLE 4

| | The number of cycles at which the battery had a capacity retention of 80% or higher |
|---|---|
| Example 4 | 220 |
| Comparative Example 6 | 180 |
| Comparative Example 7 | 130 |

As shown in Table 4, the lithium metal battery of Example 4 had an increased number of cycles at which the battery had a capacity retention of 80% or higher, as compared with the lithium metal batteries of Comparative Examples 6 and 7. Therefore, lifespan characteristics of the lithium metal battery were improved.

That is, in the lithium metal battery of Example 4, the migration of anions was suppressed and/or prevented in the vicinity of a surface of the lithium metal negative electrode, and thus a side reaction between the lithium metal negative electrode and anions was suppressed, as compared with the lithium metal batteries of Comparative Examples 6 and 7. Further, by an increased lithium ion transference number, volumetric change of the lithium metal negative electrode and the formation of lithium dendrites were suppressed, thereby improving lifespan characteristics.

As apparent from the foregoing description, according to an aspect, by employing the composite electrolyte including a positively charged particle, a side reaction on a surface of a lithium metal negative electrode may be prevented so that the volumetric change of the lithium battery may be suppressed, thereby improving charging and discharging characteristics of the lithium battery.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite electrolyte, comprising:
a particle, wherein the particle is positively charged; and
a lithium salt,
wherein the particle comprises:
a core; and
a functional group bound to the core via a covalent bond,
wherein the functional group comprises a positively charged functional group,
wherein the particle comprises an organic particle,
wherein a size of the organic particle is in a range of about 10 nanometers to about 100 micrometers, and
wherein the positively charged functional group is represented by Formulae 3 to 10, or a combination thereof:

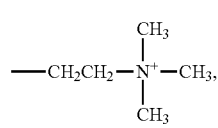

Formula 3

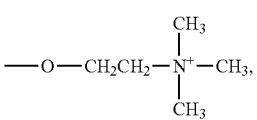

Formula 4

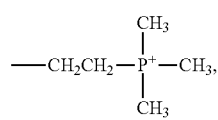

Formula 5

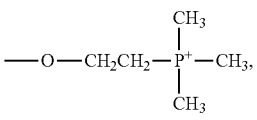

Formula 6

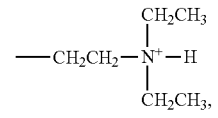

Formula 7

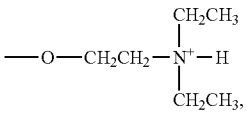

Formula 8

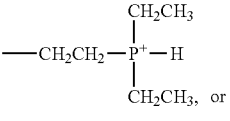

Formula 9

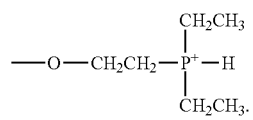

Formula 10

2. The composite electrolyte of claim 1, wherein the particle comprises a polystyrene homopolymer, a copolymer comprising a styrene repeating unit, a polymethyl methacrylate, a copolymer comprising a repeating unit having a crosslinkable functional group, a crosslinked polymer thereof, or a combination thereof.

3. The composite electrolyte of claim 1, wherein the particle comprises a polystyrene homopolymer, a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly(($C_1$-$C_9$ alkyl) methacrylate-butadiene-styrene) copolymer, a poly(styrene-($C_1$-$C_9$ alkyl) acrylate) copolymer, a poly(acrylonitrile-styrene-($C_1$-$C_9$ alkyl) acrylate) copolymer, or a combination thereof; a crosslinked structure thereof; or a combination thereof.

4. The composite electrolyte of claim 1, wherein the particle comprises a microsphere having an average diameter in a range of about 0.5 micrometer to about 50 micrometers.

5. The composite electrolyte of claim 1, wherein the lithium salt comprises LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_3$, LiPF$_3$(CF$_3$)$_3$, LiB(C$_2$O$_4$)$_2$, or a combination thereof.

6. The composite electrolyte of claim 1, further comprising a polymer.

7. The composite electrolyte of claim 6, wherein the polymer comprises polyethylene oxide, polyvinylidene fluoride, polyvinylidene fluoride-hexafluoropropylene, a poly(styrene-b-ethyleneoxide) block copolymer, poly(styrene-butadiene), poly(styrene-isoprene-styrene), a poly(styrene-b-divinylbenzene) block copolymer, a poly(styrene-ethylene oxide-styrene) block copolymer, or a combination thereof.

8. A composite electrolyte, comprising:
a particle, wherein the particle is positively charged; and
a lithium salt,
wherein the particle comprises:
a core; and
a functional group bound to the core via a covalent bond,
wherein the functional group comprises a positively charged functional group,
wherein the particle comprises an organic particle,
wherein a size of the organic particle is in a range of about 10 nanometers to about 100 micrometers,
wherein the positively charged functional group is represented by Formulae 3 to 10, or a combination thereof:

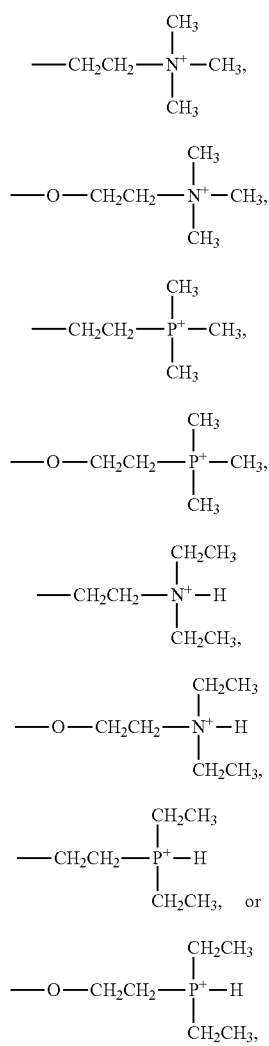

and
wherein a lithium ion mobility of the composite electrolyte is greater than a lithium ion mobility of a comparable composite electrolyte comprising the lithium salt and not comprising the particle.

9. A protective film comprising the composite electrolyte of claim 1.

10. The protective film of claim 9, wherein the protective film has a tensile modulus of greater than $10^6$ pascals.

11. The protective film of claim 9, further comprising a crosslinked product of a polymerizable oligomer between the particles.

12. The protective film of claim 11, wherein the polymerizable oligomer comprises diethylene glycol diacrylate, triethylene glycol diacrylate, tetraethylene glycol diacrylate, polyethylene glycol diacrylate, dipropylene glycol diacrylate, tripropylene glycol diacrylate, ethoxylated trimethylolpropane triacrylate, acrylate-functionalized ethylene oxide, 1,6-hexanediol diacrylate, ethoxylated neopentyl glycol diacrylate, propoxylated neopentyl glycol diacrylate, allyl methacrylate, trimethylol propane triacrylate, trimethylol propane trimethacrylate, pentaerythritol triacrylate, ethoxylated/propoxylated trimethylolpropane triacrylate, glyceryl propoxylated triacrylate, tris(2-hydroxyethyl) isocyanurate triacrylate, pentaerythritol tetraacrylate, dipentaerythritol pentaacrylate, or a combination thereof.

13. The protective film of claim 9, further comprising a liquid electrolyte comprising a lithium salt and an organic solvent.

14. The protective film of claim 13, wherein the organic solvent comprises ethylene carbonate, propylene carbonate, dimethyl carbonate, diethyl carbonate, ethyl methyl carbonate, fluoroethylene carbonate, γ-butyrolactone, dimethoxyethane, diethoxyethane, diethylene glycol dimethyl ether, triethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, tetraethylene glycol dimethyl ether, 1,1,2,2-tetrafluoroethyl 2,2,3,3-tetrafluoropropyl ether, or a combination thereof.

15. The protective film of claim 9, further comprising an ionic liquid, a metal salt comprising a Group 1 or 2 element, a nitrogen-containing additive, boron nitride, an ion conductive polymer, or a combination thereof.

16. A protected negative electrode comprising:
a negative electrode comprising lithium metal or a lithium metal alloy; and
the protective film according to claim 9 on the negative electrode.

17. The protected negative electrode of claim 16, wherein the protective film comprises an assembled particle monolayer or a plurality of stacked particle monolayers.

18. A lithium battery comprising:
a positive electrode;
a protected negative electrode comprising lithium metal or a lithium metal alloy, and a protective film on the lithium metal or a lithium metal alloy; and
an electrolyte between the positive electrode and the protected negative electrode,
wherein the protective film comprises a composite electrolyte,
wherein the electrolyte comprises the composite electrolyte according to claim 1; and
a lithium salt.

19. The lithium metal battery of claim 18, wherein the electrolyte comprises a liquid electrolyte, a solid electrolyte, a gel electrolyte, a polymer ionic liquid, a separator, or a combination thereof.

20. The lithium metal battery of claim 18, further comprising:
a monolayer structure comprising a first liquid electrolyte layer in contact with the protective film of the protected negative electrode, or
a monolayer structure comprising a first liquid electrolyte layer comprising a separator in contact with the protective film of the protected negative electrode, wherein a first liquid electrolyte is impregnated in the separator.

21. The lithium metal battery of claim 18, further comprising a multi-layer structure comprising a first liquid electrolyte layer comprising,
a separator in contact with the protective film of the protected negative electrode, wherein a first liquid electrolyte is impregnated in the separator;
a second solid electrolyte layer in contact with the first liquid electrolyte layer and comprising a ceramic conductor; and
a second liquid electrolyte layer in contact with the second solid electrolyte layer.

22. The lithium metal battery of claim 18, further comprising a multi-layer structure comprising, a first solid electrolyte layer in contact with the protective film of the protected negative electrode and comprising the composite electrolyte;

a second solid electrolyte layer in contact with the first solid electrolyte layer and comprising a ceramic conductor; and a second liquid electrolyte layer in contact with the second solid electrolyte layer.

23. The lithium metal battery of claim 18, further comprising a multi-layer structure comprising, a first solid electrolyte layer in contact with the protective film of the protected negative electrode and comprising the composite electrolyte;

a first liquid electrolyte comprising a separator in contact with the first solid electrolyte, wherein a first liquid electrolyte is impregnated in the separator;

a second solid electrolyte layer in contact with the first liquid electrolyte layer and comprising a ceramic conductor; and a second liquid electrolyte layer in contact with the second solid electrolyte layer.

24. The lithium metal battery of claim 18, further comprising a multi-layer structure comprising, a second solid electrolyte layer in contact with the protective film of the protected negative electrode and comprising a ceramic conductor; and a second liquid electrolyte layer in contact with the second solid electrolyte layer.

25. The lithium metal battery of claim 18, wherein a change in thickness of the protected negative electrode after charging and discharging is less than a change in thickness of a protected negative electrode comprising a protective film comprising a particle that is not positively charged.

* * * * *